(12) United States Patent
Ordonez

(10) Patent No.: US 11,461,599 B2
(45) Date of Patent: Oct. 4, 2022

(54) CLASSIFICATION OF IMAGES BASED ON CONVOLUTION NEURAL NETWORKS

(71) Applicant: Kennesaw State University Research and Service Foundation, Inc., Kennesaw, GA (US)

(72) Inventor: Pablo F. Ordonez, Marietta, GA (US)

(73) Assignee: Kennesaw State University Research And Service Foundation, Inc., Kennesaw, GA (US)

( * ) Notice: Subject to any disclaimer, the term of this patent is extended or adjusted under 35 U.S.C. 154(b) by 0 days.

(21) Appl. No.: 16/405,675

(22) Filed: May 7, 2019

(65) Prior Publication Data

US 2020/0034669 A1    Jan. 30, 2020

Related U.S. Application Data

(60) Provisional application No. 62/667,923, filed on May 7, 2018.

(51) Int. Cl.
*G06V 10/24* (2022.01)
*G06K 9/62* (2022.01)
(Continued)

(52) U.S. Cl.
CPC .......... *G06K 9/6292* (2013.01); *G06K 9/628* (2013.01); *G06K 9/6262* (2013.01);
(Continued)

(58) Field of Classification Search
CPC .......... G06N 3/08; G06N 3/0454; G06K 9/32; G06K 9/6292; G06K 9/628; G06K 9/54;
(Continued)

(56) References Cited

U.S. PATENT DOCUMENTS

| | | | | |
|---|---|---|---|---|
| 2006/0222221 | A1* | 10/2006 | Sathyanarayana ... | G06K 9/6292 382/128 |
| 2012/0257164 | A1* | 10/2012 | Zee .................... | A61B 3/12 351/246 |

(Continued)

OTHER PUBLICATIONS

Pablo F. Ordonez; "Classification of Images Based on Small Local Features: A Case Applied to Microaneurysms In Fundus Retina Images"; Journal of Medical Imaging; vol. 4(4); Oct.-Dec. 2017; p. 041309-1-041309-17.

*Primary Examiner* — Syed Haider
(74) *Attorney, Agent, or Firm* — Smith, Gambrell & Russell LLP

(57) ABSTRACT

Systems and methods are described for image classification. An example method may comprise receiving an image comprising an object of interest and determining, based on a first convolution neural network, a first classification of the image. The first convolution neural network may be optimized for a first factor. The method may comprise determining, based on a second convolution neural network, a first classification of the image. The second convolution neural network may be optimized for a second factor. The method may comprise determining, based on the first classification and the second classification, a characteristic of the object of interest. The method may comprise providing the characteristic of the object of interest.

8 Claims, 23 Drawing Sheets

(51) Int. Cl.
  *G06T 7/60* (2017.01)
  *G06N 3/04* (2006.01)
  *G06V 10/20* (2022.01)
(52) U.S. Cl.
  CPC ............ *G06N 3/0454* (2013.01); *G06T 7/60* (2013.01); *G06V 10/20* (2022.01); *G06V 10/24* (2022.01); *G06T 2207/20084* (2013.01); *G06T 2207/20132* (2013.01); *G06T 2207/30041* (2013.01); *G06T 2207/30096* (2013.01); *G06T 2207/30101* (2013.01); *G06V 2201/03* (2022.01)
(58) Field of Classification Search
  CPC .... G06K 9/6262; G06K 2209/05; G06T 7/60; G06T 7/0012; G06T 2207/20084; G06T 2207/20132; G06T 2207/20081; G06T 2207/30096; G06T 2207/10024; G06T 2207/30101; G06T 2207/30041; G06V 10/20; G06V 10/454; G06V 10/82; G06V 10/24; G06V 2201/03
  See application file for complete search history.

(56) References Cited

U.S. PATENT DOCUMENTS

| | | | |
|---|---|---|---|
| 2012/0316421 A1* | 12/2012 | Kumar | A61B 1/041 600/407 |
| 2017/0046613 A1* | 2/2017 | Paluri | G06N 3/0454 |
| 2018/0214087 A1* | 8/2018 | Balaji | G06V 10/454 |
| 2018/0315193 A1* | 11/2018 | Paschalakis | G06N 3/08 |
| 2020/0085290 A1* | 3/2020 | Wang | G06T 7/0014 |
| 2020/0085382 A1* | 3/2020 | Taerum | G06N 3/084 |
| 2020/0202103 A1* | 6/2020 | Tang | G06K 9/00536 |

* cited by examiner

CLASSIFICATION OF IMAGES BASED ON CONVOLUTION NEURAL NETWORKS

CROSS-REFERENCE TO RELATED APPLICATIONS

This application claims priority to U.S. Provisional Patent Application No. 62/667,932, filed May 7, 2018, the disclosure of which is hereby incorporated by reference in its entirety.

BACKGROUND

The development of a noninvasive method that detects diabetes during its early stages would improve the prognosis of patients. The retina is targeted in the early stages of diabetes, and the prevalence of diabetic retinopathy (DR) increases with the duration of the disease. Microaneurysms are early lesions of the retina, and as the disease progresses, damage to the retina includes exudates, hemorrhages, and vessel proliferation. The detection of DR in its early stages can prevent serious complications, such as retinal detachment, glaucoma, and blindness. However, the screening methods used to detect diabetes are invasive tests, the most popular one being measuring blood sugar levels.

Microaneurysms detection in DR is a complex challenge, and the difficulty of this task is determined mainly by the size of the lesions. Most of the DR studies have been focused on classifying its stages, rather than identifying the specific lesion. Indeed, R-CNN, fast R-CNN, and faster R-CNN have been used for object localization with excellent results, but this still has not solved the problem for small features. Some studies tried to overcome this obstacle by cropping the image with the lesion in the center without changing the resolution. Karphaty et al. introduced the idea of foveal stream for video classification by cropping the image stream into its center. Lim was the first author to use the CNN to classify individual lesions on DR. His work used an automatized algorithm, multiscale C-MSER segmentation, to crop the region of interest with the lesion in the center of the image. van Grinsven's work developed a selective data sampling for the detection of hemorrhages, where the lesions were placed in the center of a cropped image of 41×41 pixels. Although these studies have an acceptable sensitivity and specificity, the number of false positives is considerable. The following example will explain the reason of having a high number of false positives: Having an image size of 2000×2000 pixels will generate 2304 images with a size of 41×41 pixels, so having a specificity of 90% will produce 231 false positive images with a size of 41×41. Thus, there is a need for improved methods for screening for diabetic retinopathy and other types of feature recognition.

SUMMARY

Aspects of the disclosure relate to systems and methods for determining usage information associated with content. Aspects of the disclosure further relate to systems and methods for image classification. An example method may comprise receiving an image comprising an object of interest and determining, based on a first convolution neural network, a first classification of the image. The first convolution neural network may be optimized for a first factor. The method may comprise determining, based on a second convolution neural network, a first classification of the image. The second convolution neural network may be optimized for a second factor. The method may comprise determining, based on the first classification and the second classification, a characteristic of the object of interest. The method may further comprise providing the characteristic of the object of interest.

BRIEF DESCRIPTION OF THE DRAWINGS

The following drawings show generally, by way of example, but not by way of limitation, various examples discussed in the present disclosure. In the drawings.

DETAILED DESCRIPTION

Systems and methods are described for image classification. Qualitative improvement of the image not only facilitates the detection of the lesions for annotations, but also decreases the number of epochs needed to reach a high accuracy for training and validation sets. Because the colors of microaneurysms are located between 650 and 570 nm in the light spectrum and it is not possible to find cyan colored microaneurysms, color reduction plays a significant role in medical images where its variance is limited. The benefits of shortening the training time are economic, environmental, and human and can be reflected in the cost reduction.

Figure 1A:
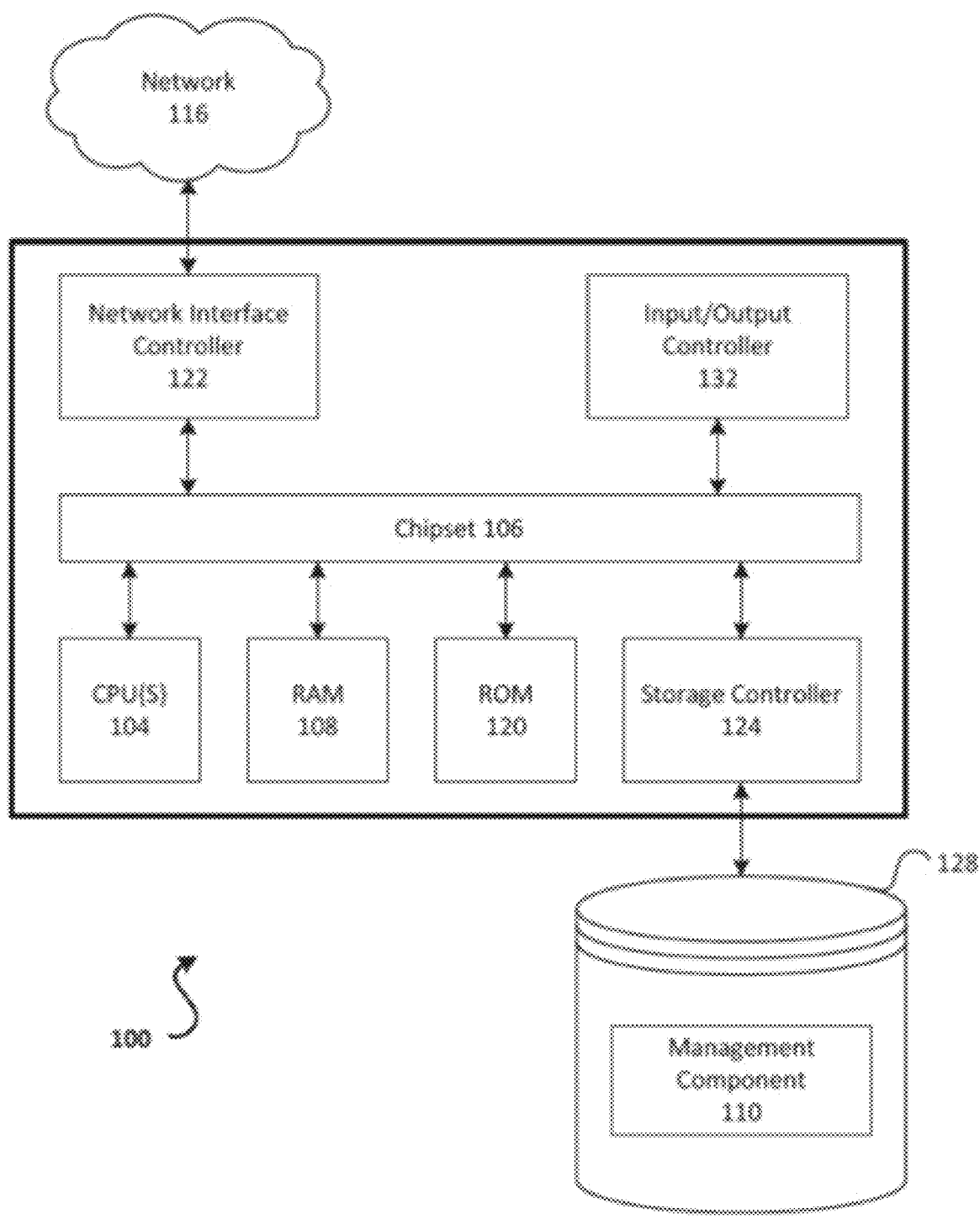
FIG. 1A shows an example computer architecture for a computer 100 configured to execute software for performing operations as described herein.

FIG. 1 shows an example computer architecture for a computer 100 configured to execute software for performing operations as described herein. It will be appreciated that the described processes may be performed by any suitable system components including by discrete computing systems that communicate over a communications link. The computer architecture shown in FIG. 1 shows a conventional server a computer, a workstation, a desktop computer, a laptop, a tablet, a network appliance, a PDA, an e-reader, a digital cellular phone, or other computing node, and may be utilized to execute any aspects of the software components presented herein.

The computer 100 may include a baseboard, or "motherboard," which is a printed circuit board to which a multitude of components or devices may be connected by way of a system bus or other electrical communication paths. One or more central processing units (CPUs) 104 may operate in conjunction with a chipset 106. CPUs 104 may be standard programmable processors that perform arithmetic and logical operations necessary for the operation of computer 100.

The CPUs 104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The chipset 106 may provide an interface between CPUs 104 and the remainder of the components and devices on the baseboard. The chipset 106 may provide an interface to a random access memory (RAM) 108 used as the main memory in computer 100. The chipset 106 may provide an interface to a computer-readable storage medium, such as a read-only memory (ROM) 120 or non-volatile RAM (NVRAM) (not shown), for storing basic routines that may help to start up the computer 100 and to transfer information between the various components and devices. The ROM 120 or NVRAM may also store other software components necessary for the operation of computer 100 in accordance with the embodiments described herein.

The computer 100 may operate in a networked environment using logical connections to remote computing nodes and computer systems through LAN 116. The chipset 106 may include functionality for providing network connectivity through a network interface controller (NIC) 122, such as a gigabit Ethernet adapter. NIC 122 may be configured to connect the computer 100 to other computing nodes over the LAN 116. It should be appreciated that multiple NICs 122 may be present in the computer 100, connecting the computer to other types of networks and remote computer systems.

The computer 100 may be connected to a mass storage device 128 that provides non-volatile storage for the computer. The mass storage device 128 may store system programs, application programs, other program modules, and data, which have been described in greater detail herein. The mass storage device 128 may be connected to the computer 100 through a storage controller 124 connected to the chipset 106. The mass storage device 128 may comprise of one or more physical storage units. The storage controller 124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 100 may store data on the mass storage device 128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 128 is characterized as primary or secondary storage and the like.

The computer 100 may store information to the mass storage device 128 by issuing instructions through the storage controller 124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 100 may read information from the mass storage device 128 by detecting the physical states or characteristics of one or more particular locations within the physical storage units.

The computer 100 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 100.

The computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

The mass storage device 128 may store an operating system utilized to control the operation of the computer 100. According to one embodiment, the operating system comprises a version of the LINUX operating system. According to another embodiment, the operating system may comprise a version of the WINDOWS SERVER operating system from the MICROSOFT Corporation. The operating system may comprise a version of the UNIX operating system. It should be appreciated that other operating systems may also be utilized. The mass storage device 128 may store other system or application programs and data utilized by the computer 100, such as the management component 110 and/or the other software components described above. The management component 110 may be configured to implement the disclosure described herein.

The mass storage device 128 or other computer-readable storage media may also be encoded with computer-executable instructions, which, when loaded into the computer 100, transforms the computer from a general-purpose computing system into a special-purpose computer capable of implementing the embodiments described herein. These computer-executable instructions transform the computer 100 by specifying how CPUs 104 transition between states, as described above. The computer 100 may have access to computer-readable storage media storing computer-executable instructions, which, when executed by the computer 100, may perform operating procedures described herein and in the attached Appendix.

The computer 100 may also include an input/output controller 132 for receiving and processing input from a number of input devices, such as a keyboard, a mouse, a touchpad, a touch screen, an electronic stylus, or other type of input device. Similarly, the input/output controller 132 may provide output to a display, such as a computer monitor, a flat-panel display, a digital projector, a printer, a plotter, or other type of output device. It will be appreciated that the computer 100 may not include all of the components shown in FIG. 1, may include other components that are not explicitly shown in FIG. 1, or may utilize an architecture completely different than that shown in FIG. 1.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

It will be appreciated that while illustrative embodiments have been disclosed, the scope of potential embodiments is not limited to those explicitly described. While the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition or in the alternative, certain method or process blocks may be omitted in some implementations. The methods and processes described herein are also not limited to any particular sequence, and the blocks or states relating thereto can be performed in other sequences that are appropriate. The described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. The elements may be added to, removed from or rearranged compared to the disclosed example embodiments.

It will also be appreciated that various items are shown as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the computing systems via intercomputer communication. In some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the features described herein may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the disclosure described herein may be embodied in a variety of other forms; furthermore, various omissions, substitutions, and changes in the form of the disclosure described herein may be made without departing from the spirit of the inventions disclosed herein. The accompanying claims and their equivalents are intended to cover such forms or modifications as would fall within the scope and spirit of certain of the inventions disclosed herein.

The systems and methods described herein relate to classification of images based on small local features and more specifically to microaneurysms in fundus retina images. Classification of images based on small objects is difficult. Specifically, the clinical classification of diabetic retinopathy (DR) reflects its severity. A consensus in 2003 proposed the diabetic retinopathy disease severity scale, which consists of five classes for DR. Class zero or the normal class has no abnormalities in the retina; class 1, or the mild class, shows only <5 microaneurysms; class 2 or the moderate class is considered as the intermediate state between classes 1 and 3; class 3 or the severe class contains either >20 intraretinal hemorrhages in one of the four quadrants, venous beading in two quadrants, or intraretinal microvascular abnormalities in one quadrant; and class 4 or the proliferative class includes neovascularization, or vitre-ous and pre-retinal hemorrhages. The severity level of the disease progresses from classes 1 to 4, and special consideration is given to lesions close to the macular area.

Although some models classify moderate and severe stages of DR very well, when classifying lesions that belong to class 1 and 2, current methods face certain challenges. The lesions in these classes contain microaneurysms with a maximum size of <1% of the entire image. Having a size of <1% of the total image, microaneurysms are early lesions in diabetic retinopathy that are difficult to classify. As a result, algorithms may select small groups of lesions, however, lesions grouped in larger numbers in such a way that they mimic hemorrhages may not be detected. Further, some known models may select some small artifacts as lesions.

Accordingly, the systems and methods contemplated herein may improve the accuracy of detection of microaneurysms. In embodiments of the disclosure described herein, one or more image classification techniques may be utilized to select, process, and, if necessary, reprocess images or batches of images. In some embodiments, a convolutional neural networks (CNNs) model is utilized. As described herein, a CNN model may increase the performance of the identification and classification of microaneurysms representing small local features. Specifically, the CNN model may be an automatized system for detecting referable diabetic retinopathy (RDR), both moderate and severe. In embodiments of the method described herein, the method may be divided into four phases. The first phase is the input phase, where input processing utilized to enhance features and augmentation of the dataset is performed. The second phase is the convolution design phase, where modifications to the number of convolutions and filters can be completed. Variations to the type of pooling, normalization, and neural activation function may be performed at this stage. The classification phase or the third phase includes full-connected layers with the neural activation and loss function. The dropout of nodes in a full-connected layer in this phase has been a common modification, in recent studies. The fourth phase is the training phase, where the learning parameters and learning algorithms may be altered and feedback may be performed. Each phase may be evaluated separately, in order to measure the impact of changing a parameter on that phase.

The method combines the sequential use of first and second CNNs. For example, the method may employ a first CNN with a high sensitivity followed by a second CNN with a high specificity to detect microaneurysms with few false positives. In addition, a feedback method for training is disclosed that has the ability to improve accuracy. In further embodiments, a preprocessing technique may be able to decrease training time and improve the quality of the images for annotations.

In some embodiments, a method may comprise building a model that includes at least two CNNs with different input image sizes. For instance, image sizes 60×60 and 420×420 pixels are contemplated. The model may be trained using one or more datasets (e.g., Kaggle and/or Messidor datasets). The model may then be tested independently against a dataset (e.g., the Kaggle dataset), showing a sensitivity >91%, a specificity >93%, and an area under the receiver operating characteristics curve >93%. By combining two or more trained models, a reduction of false positives for complete images by about 50% may be achieved, and a sensitivity of about 96% may be achieved when tested against the DiaRetDB1 dataset. An image preprocessing system and method is also described, that improves images for annotations and decreases the number of epochs during training.

In some embodiments, one or more images may be received into a cloud database. For example, a mobile device or other such device may receive an image (e.g., of an object of interest, such as an eye) taken by a user. The image may be uploaded to a cloud based system that may then analyze the image and providing a screening result, based on the methods and systems described here.

To detect microaneurysms and to differentiate images with and without lesions, methods according to embodiments of the disclosure may select images belonging to classes 0, 1, and 2 using one or more datasets. In some embodiments, the datasets utilized are included in one or more of the Kaggle diabetic-retinopathy-detection competition, Messidor database, and the diabetic retinopathy database and evaluation protocol. The Kaggle dataset implements the clinical diabetic retinopathy scale to determine the severity of DR (none, mild, moderate, severe, and proliferative) and contains 88,702 fundus images. Table 1 shows unbalanced data with prominent differences between mild and normal classes. It is also evident that most of the images belong to the testing set. The subset includes 21,203 images, in which 9441 are used for training, and 11,672 are used for testing. Random samples may be selected from the normal class that have at most a confidence interval of 1, a confidence level of 95%, and selected all of the cases in the mild class. The testing set may be subdivided into a validation and testing set. The Messidor dataset is within the public domain, and includes 1200 eye fundus color images of all classes are provided by the Messidor dataset. The annotation includes a DR grade of (0 to 3) and a risk of macular edema grade of (0 to 2), where grades 1 and 2 may be included in the training set. From those, 153 are classified as grade 1 and 246 as grade 2, where only isolated microaneurysms may be selected. The diabetic retinopathy database and evaluation protocol (DiaRetDB1) is a public set of 89 images. The diabetic retinopathy dataset also includes ground truth annotations of the lesions from four experts, which are labeled as small red dots, hemorrhage, hard exudates, and soft exudates. The diabetic retinopathy will be used for testing purposes.

Table 2 shows the number of images per class in each exemplary database.

TABLE 1

Kaggle raw database.

|  | Training | Testing |
|---|---|---|
| All | 35,126 | 53,576 |
| Normal | 25,810 | 39,533 |
| Mild | 2,443 | 3,762 |

In some embodiments, a machine learning framework (e.g., Torch) may be utilized and the multi-graphics processing unit (GPU) Lua scripts may be adapted to execute iterations of the method. Other contemplated frameworks may include, but not be limited to, OpenCV for imaging processing, R-Cran for statistical analysis and plotting, and Gnuplot for graphing. In some embodiments, training of the CNNs may be performed on a 16.04 Ubuntu Server with four Nvidia M40 GPU's using Cuda 8.0 and Cudnn 8.0. In some embodiments, a torch script may randomly select between a normal DR class and a mild DR class image to utilize as the input. After a batch is selected, the script may, once again, randomly select a picture from the data pool of the class, making the processes completely stochastic. In addition, a feedback mechanism may be created during training, in order to resend images that are not classified correctly.

Method may further include creating an improved image for the annotations comprising applying a preprocessing approach according to embodiments of the disclosure. In a first step, coordinates of the lesions may be selected. In second step and third steps, the images with the lesions may be cropped, and normal fundus images may be cropped. Although the fovea in the retina has a more concentrated area with photoreceptors, it is the attention that defines the discrimination of the objects. In a similar way, keeping the same resolution of the image, but cropping the image to the object of interest may simulate the attention. In addition, cropping the image with the lesion in different positions of the image gives the input data a higher variance. The method provides that the CNN learns the center position instead of the features of the lesion itself. Note that second and third steps may be sequential or simultaneous. Sequentially using a test with high sensitivity and a test with high specificity may decrease the number of false positives. Although the same methodology, CNN, may be used for both sets (60×60 and 420×420) they differ in the model and input size. As a result, these models may be considered different types of tests. Increasing the sensitivity in the 420×420 set by increasing the input size and implementing feedback may diminish false positives generated when CNNs are applied to cropped images with a size of 60×60 pixels. For example, two datasets with cropped sizes of 60×60 and 420×420, respectively may be obtained and trained using modified CNNs. Systems and methods described herein may further include a feedback mechanism for training. The increase in the size of the dataset may be evaluated by using either augmentation or adding new images.

Receiver operating characteristics (ROC) may be used to obtain a cutoff of the predicted values in order to obtain a more accurate sensitivity and specificity of the models. Further, an analysis on the more precise model with the DiaRetDB1 may be performed to identify its overall sensitivity in the complete image. Table 2 shows the number of images per class in each database.

TABLE 2

Exemplary database.

|  | Kaggle | | Messidor | DiaRetDB1 |
|---|---|---|---|---|
|  | Training | Testing | Training | Testing |
| Normal | 8,000 | 8,000 |  |  |
| Class 1 | 2,443 | 3,762 | 153 |  |
| Class 2 |  |  | 246 |  |
| All |  |  |  | 89 |

Some images may include more than one microaneurysm and each microaneurysm may be counted as different.

Method may include performing a first processing step on one or more images in a dataset. For instance, in some embodiments, batch transformations on the lightness and color of the images may be used to produce higher quality images for annotations, and a comparative analysis of using CNNs with inputs of images with and without preprocessing may be performed.

Descriptive statistics may then be calculated, and K-means analysis may be used to divide the images into three groups (dark, normal, and bright). A function based on the statistics may be performed to transform the lightness of the images using LAB color space. After collecting the a* and b* intensity values in the LAB color space from vessels, microaneurysms, hemorrhages, and a normal background, a support vector machine may be used to separate microaneurysms and hemorrhages from the background.

TABLE 3

Train images statistics.

|  |  | Mean | Std | Min | Max | Range |
|---|---|---|---|---|---|---|
| Mean per picture | L* | 33.93 | 11.83 | 0.70 | 80.22 | 79.52 |
|  | a* | 11.07 | 7.35 | −9.01 | 47.63 | 56.63 |
|  | b* | 18.23 | 8.63 | −2.11 | 59.82 | 61.93 |
| Std per picture | L* | 18.09 | 4.83 | 0.42 | 37.38 | 36.95 |
|  | a* | 8.32 | 3.24 | 0.21 | 21.67 | 21.45 |
|  | b* | 10.97 | 3.76 | 0.42 | 24.54 | 24.12 |

Figure 1B:
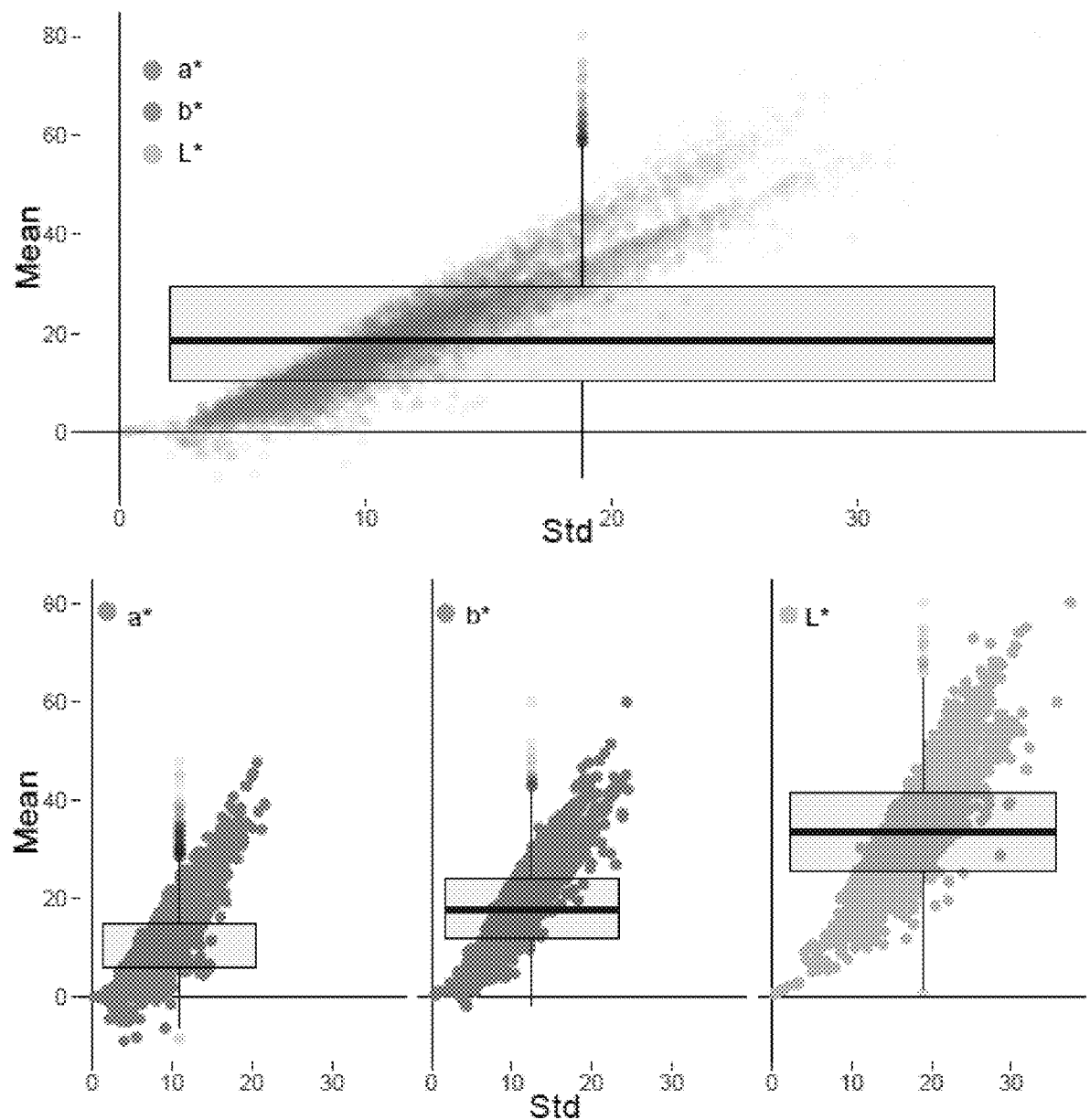
FIG. 1B is a graph illustrating L*, a*, b* channels distribution for representative images according to embodiments of the disclosure.
Figure 2:
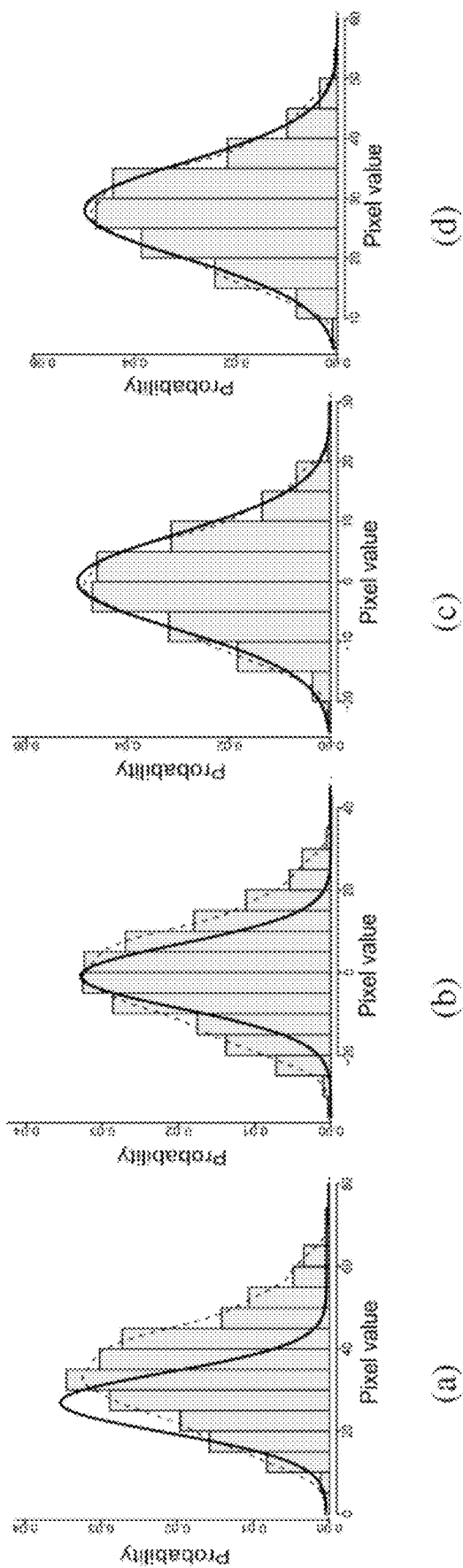
FIG. 2 is a graph illustrating pixel normalization in the following: (a) initial state, (b) zero centering, (c) spreading data, and (d) return to initial state according to embodiments of the disclosure.

In one or more steps of the method, image statistics may be gathered. For instance, LAB color space may be selected due to its property of separating luminescence from color. Table 3 shows the descriptive statistics of all of the images in the training sets and FIG. 1 shows each image with the mean represented by the y-axis and the standard deviation represented by the x-axis. The range values in Table 3 and the box plots in FIG. 1B illustrate some variety within the training set images. FIG. 1 specifically illustrates L*, a*, b* channels distribution, where the mean and standard deviation of the images are utilized to normalize, cluster, and develop a method for lightness adjustment. Normalization may be done to each pixel in respect to its own image, to all of the images, and to each one of their channels (L*, a*, b*), and the result may be displayed using a standard software package, (e.g., OpenCV). The image normalization equation utilized may be:

$$npv = (pv - mp) \times \frac{stdap}{stdp} \times k_1 + map + k_2, \quad (1)$$

where pv is the pixel value, npv is the new pixel value, mp is the mean value of the images, map is the mean value of all the images, $k_1$ constant 1, $k_2$ constant 2, stdp is the standard deviation value of the images, and stdap is the standard deviation value of all the images. The first part of the equation normalizes the pixel value based on the mean of the images and adjusts its value according to the proportion of the standard deviation of all the images and the images that owns the pixel value. The second part of the equation repositions the pixel value based on the mean of all the images. FIG. 2 shows the steps for normalization, where the continuous line represents the density probability of all the images, the discontinuous line represents the density probability of one image, and the histogram represents the distribution of the pixels values in one image. As shown in FIG. 2, pixel normalization is illustrated in the following states: (a) initial state, (b) zero centering, (c) spreading data, and (d) return to initial state.

Figure 3:
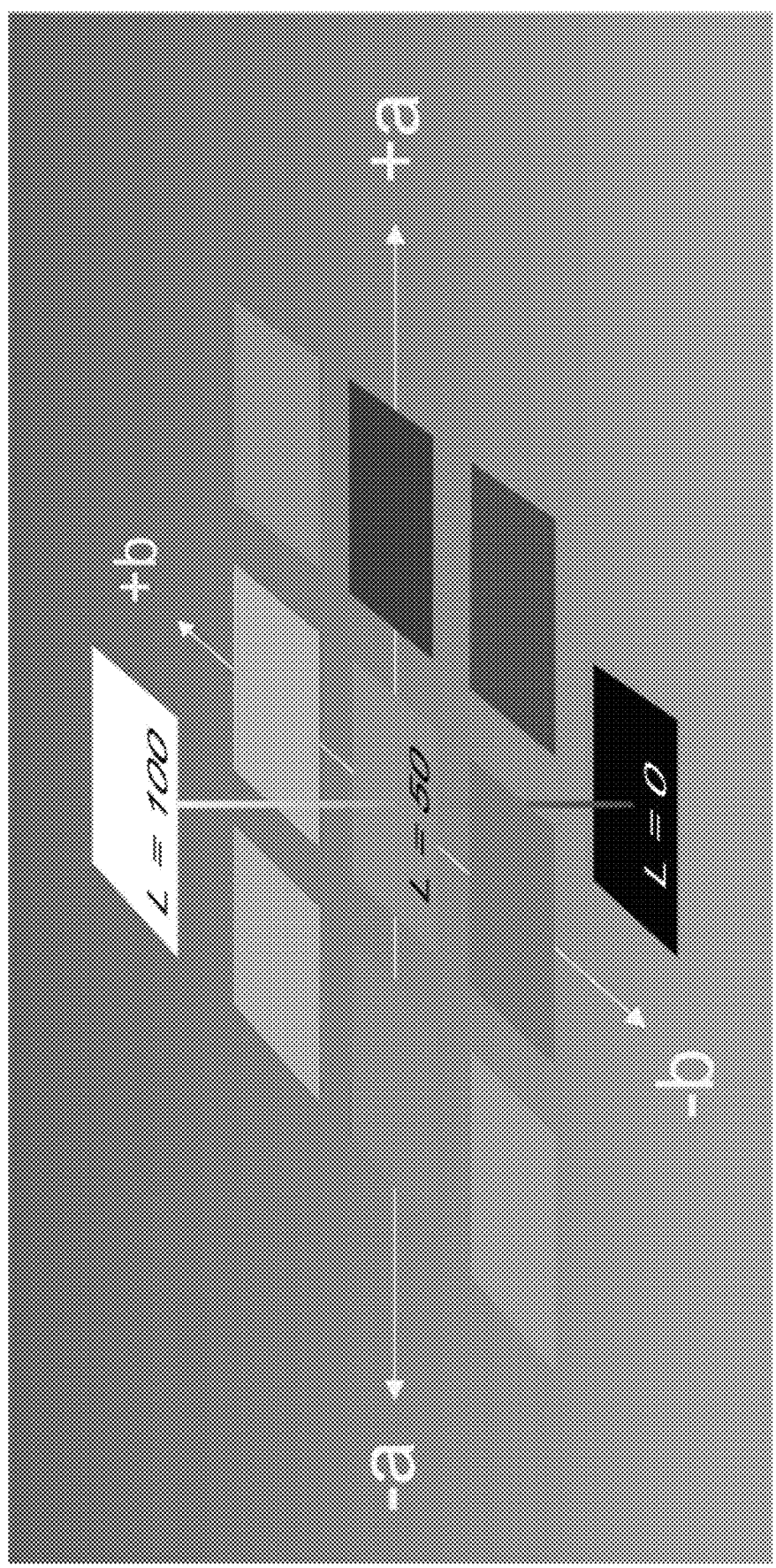
FIG. 3 illustrates a method used to modify the brightness of images in a batch according to embodiments of the disclosure.
Figures 4A, 4B:
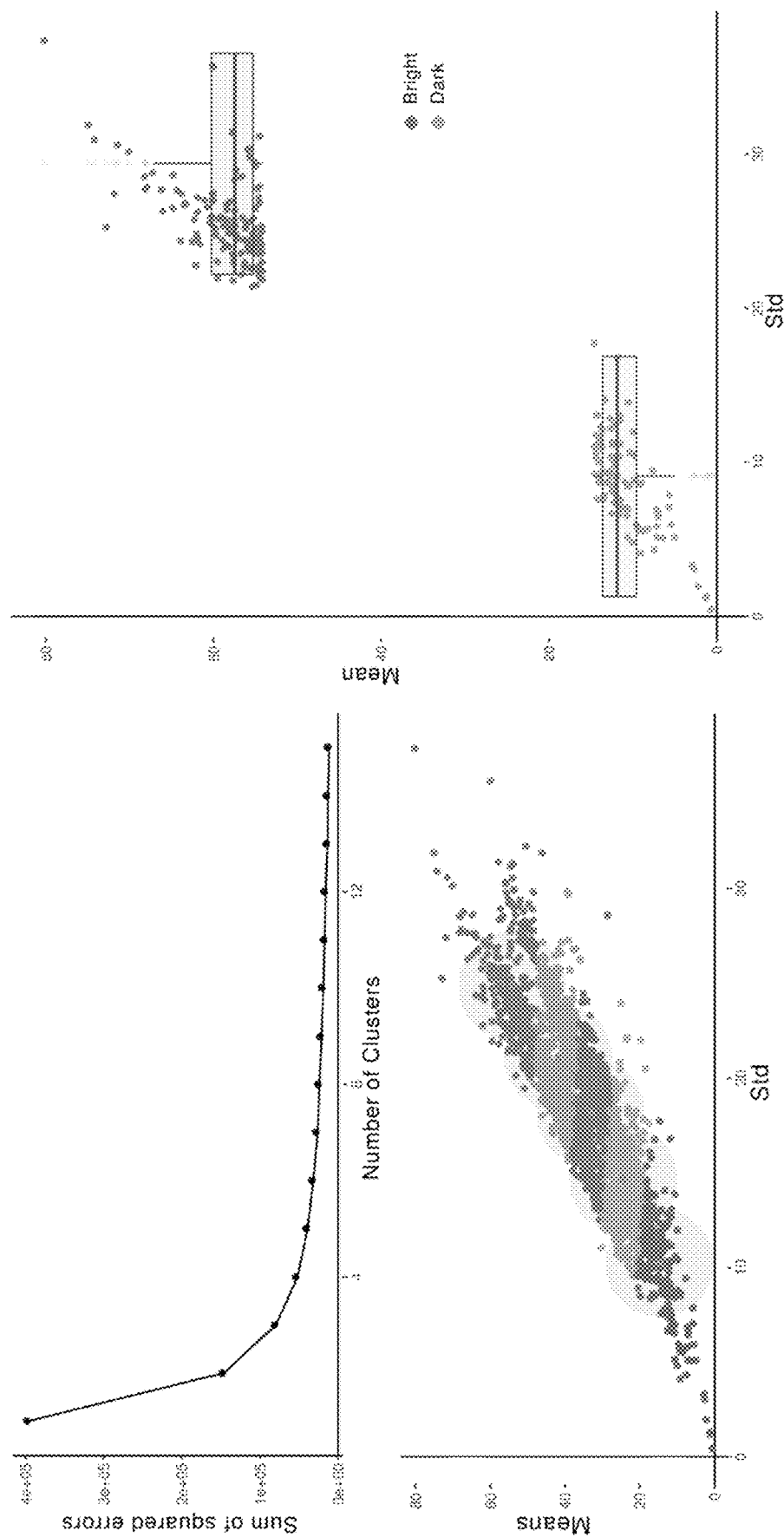
FIG. 4A is a graph illustrating use of the elbow method to obtain an optimal number of clusters and a distribution of the cluster data according to embodiments of the disclosure.
FIG. 4B is a graph illustrating that clusters 1 and 5 represent the darkest and brightest images, respectively according to embodiments of the disclosure.

Methods according to embodiments of the disclosure may include adjusting a luminance intensity for a batch. For instance, a method used to modify the brightness of all the images in a batch may be utilized. Lab color space represents color-opponent dimensions as shown in FIG. 3 (e.g., CIE L*, a*, b* color space). Once the images are normalized, an analysis of the distribution of the mean and standard deviation of the lightness of each image in the training sets may be done. The elbow method may be used to obtain the optimal number of clusters from this data. FIGS. 4A and 4B illustrate L* channel distribution, where FIG. 4A illustrates an elbow test (top) and distribution of images on clusters (bottom) and FIG. 4B illustrates distribution L* channel on clusters 1 and 5. As can be seen, FIG. 4A (top) shows five as the optimal number of clusters, and the mean and standard deviation values of those centroids are displayed in Table 4.

TABLE 4

Centroids L* channel.

| Centroid | Mean | Std |
|---|---|---|
| 1 | 14.67 | 10.26 |
| 2 | 24.40 | 14.66 |
| 3 | 33.20 | 18.21 |
| 4 | 41.81 | 21.14 |
| 5 | 54.17 | 24.86 |

Figure 5:
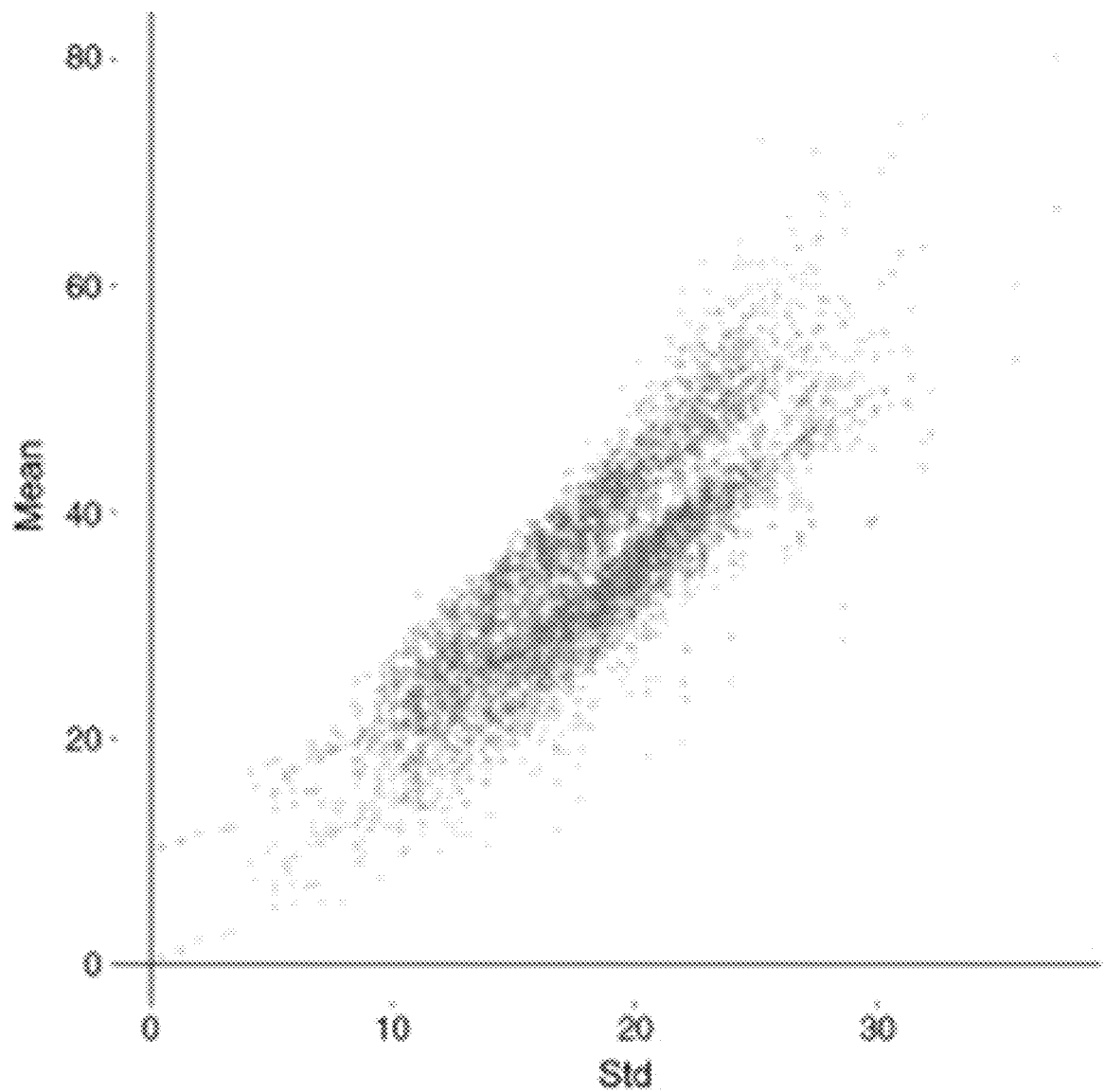
FIG. 5 is a graph illustrating the distribution L* channel on clusters 1 and 5 before and after transformation according to embodiments of the disclosure.

FIG. 4A (bottom) reveals that most of the cases are between clusters 2 and 4 and FIG. 4B shows that clusters 1 and 5 represent the darkest and brightest images, respectively. The mean pixel value of the 25th percentile of the first clusters is 10, which may be set as the lower limit for the transformation. The images may be visually inspected with a mean value of the L* channel lower than 10 and it may be determined that the images may be too dark to be readable. Notice that there are not any images with values in the y-axis above 80, making this value our superior limit for the transformation. A sample of some of the images from other clusters may be evaluated and it may be determined that high-quality images belong to the third cluster. With the collected information, the data may be transformed in such a way that extreme data representing the darkest and brightest images may move to the center. The polynomial function may be:

$$nL = L^3 \times (5.65e-06) - L^2 \times (1.53e-03) + L \times (7.98e-0.1) + 9.84, \quad (2)$$

where nL is the new L* value and L is the original L* value. The results can be visualized in FIG. 5, which illustrates L* channel distribution on clusters 1 and 5 before and after transformation. In such embodiments, the blue dots illustrated in FIG. 5 denote the transformed data values from the original image (which is represented by the red dots in FIG. 5).

The method may also include reducing color variance. As with typical blood extravasation, the microaneurysm color goes through a sequence of changes, the most common sequence going from a bright red, to a brownish, to a yellowish color. The scene may be limited in order to separate blood tissues from other structures using an original approach, thereby enhancing microaneurysms.

Figure 6B:
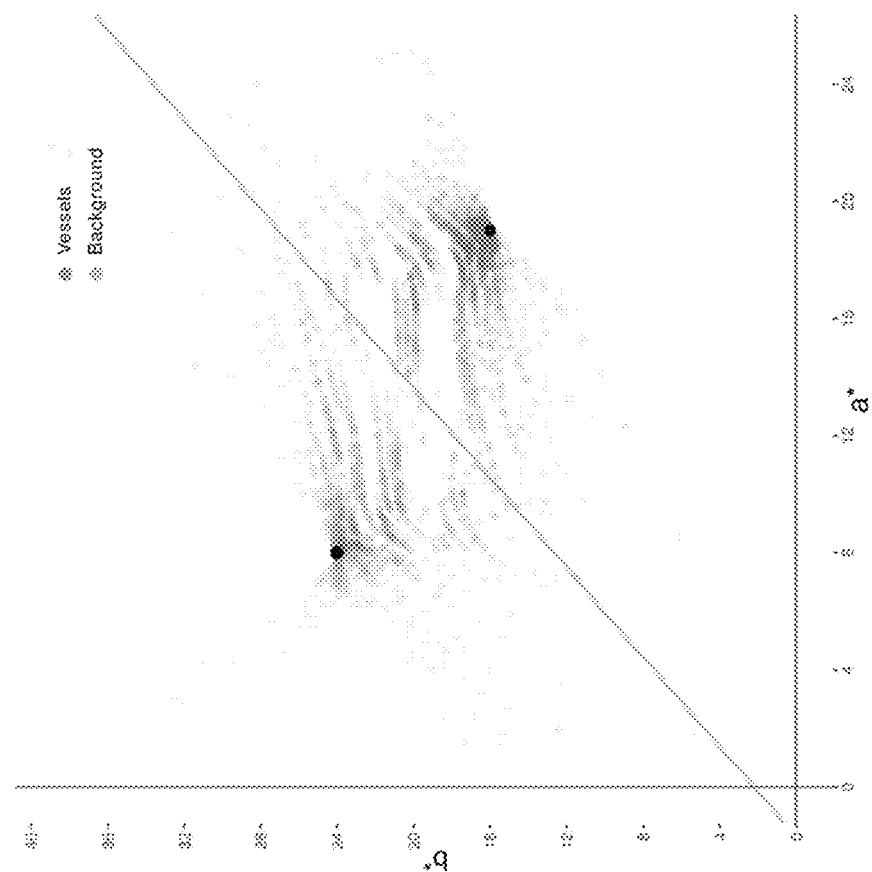
FIG. 6B is a graph illustrating the distribution b* channels after transformation according to embodiments of the disclosure.
Figure 6A:
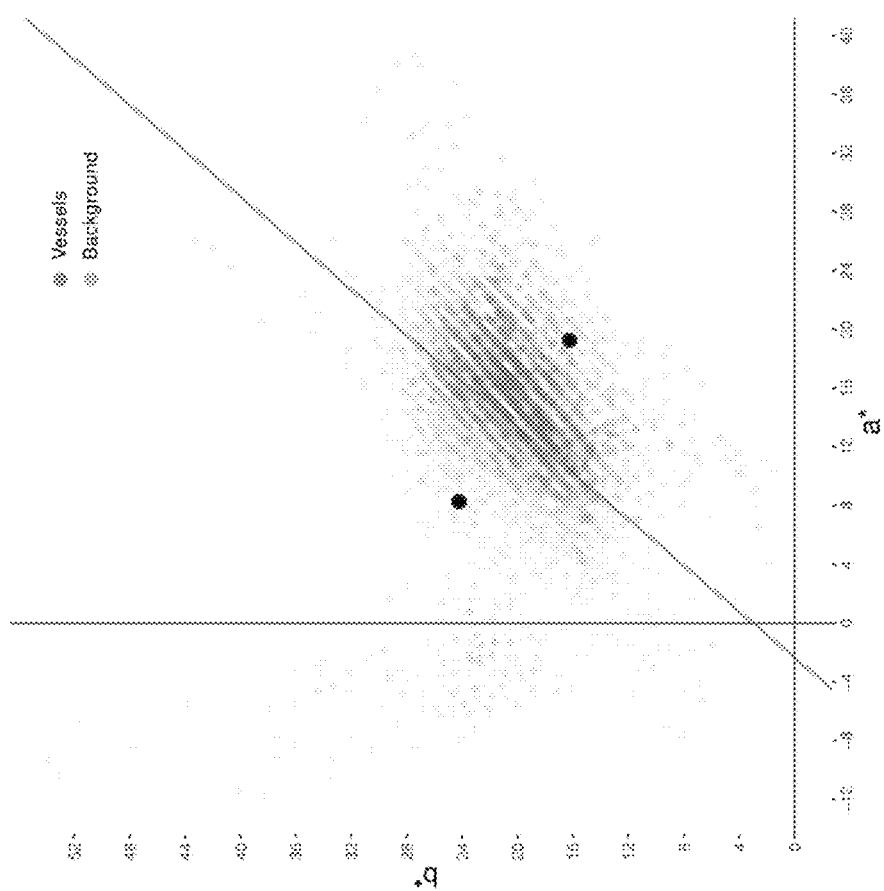
FIG. 6A is a graph illustrating the distribution a* channel before transformation according to embodiments of the disclosure.

After the normalization and the adjustment of the L* values, a dataset may be built with pixel values from vessels including microaneurysms and other structures like the optical disc, macula, exudates, normal retina, among others. FIGS. 6A and 6B illustrate distribution a* and b* channels: (a) before transformation and (b) after transformation. In FIG. 6A, each point represents the a* and b* pixels' values of the vessels and background pixels. The diamond points are the centroids of the next transformation and represent a pixel value in the Lab color space. The euclidean distance of each pixel value over each centroid may be calculated. Then, a division of these two values indicates which centroid is closest to this pixel value. Finally, the new pixel value may be obtained after applying the following equation:

$$npv \begin{cases} [(pv - bed) \times rel] + bed, & \text{if } rel \leq 1 \\ [(pv - ved) \div rel] + ved, & \text{if } rel > 1 \end{cases}, \quad (3)$$

where pv is the pixel value of a* and b*, bed is the Euclidean distance between the pixel value and the background centroid, ved is the Euclidean distance between the pixel value and the vessel centroid, rel is the division of $$\left(\frac{bed}{ved}\right)^4,$$

and npv is the new pixel value. The new pixel values are displayed in FIG. 6B.

Figure 7:
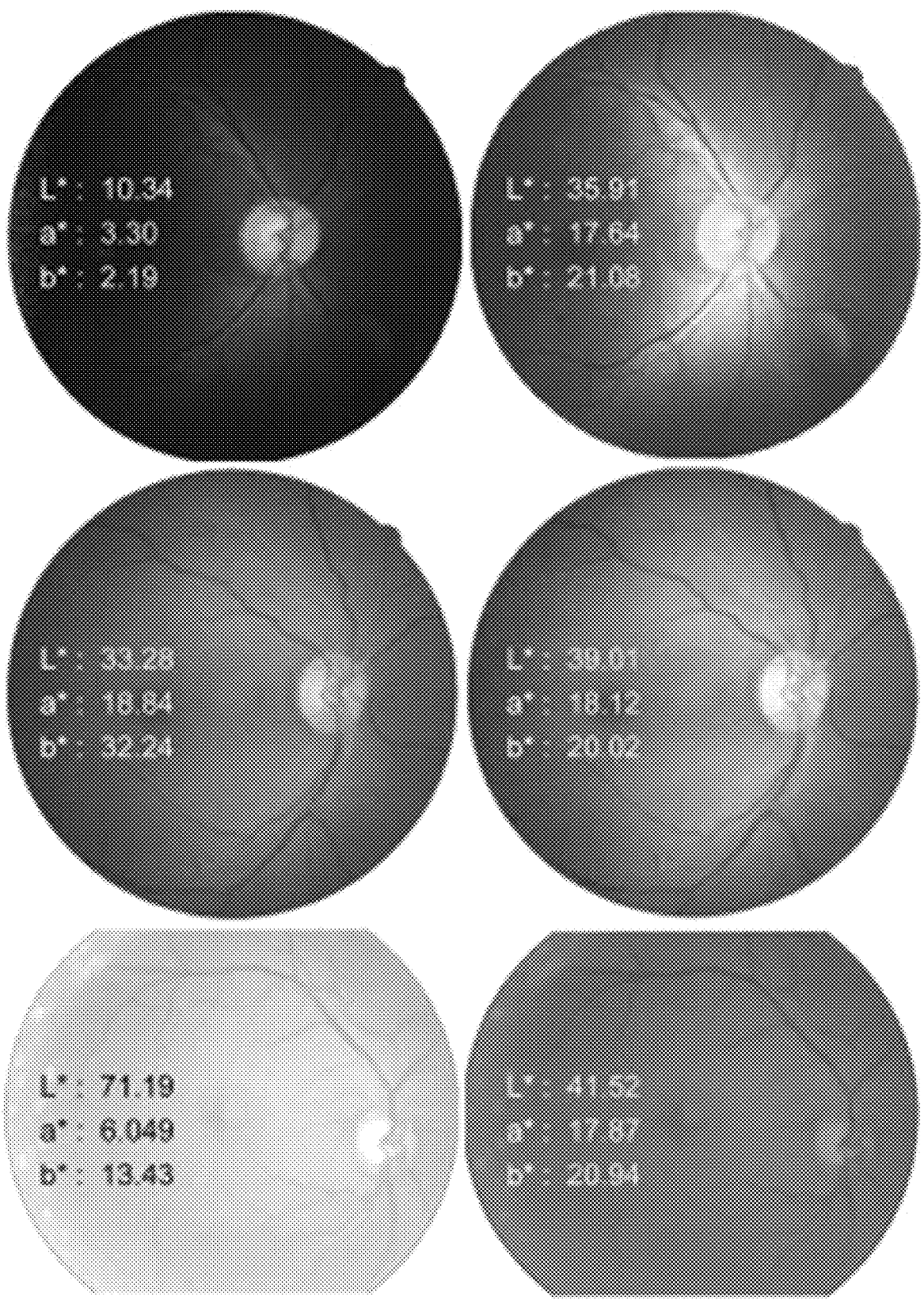
FIG. 7 illustrates a raw and processed images sampling according to embodiments of the disclosure.

Methods may further include generalizing the preprocessing method. The preprocessing methodology may be oriented to improve the quality of retina fundus images, enhance micro-aneurysms and vessels, and may be applied to any similar datasets. FIG. 7 illustrates raw and processed images sampling. Specifically, FIG. 7 shows three images selected based on the mean of the L* channel and represent the extreme and middle values of the L* channel. In addition, the mean value for each channel in the L*a*b* color is displayed in each image. After the transformation, all of the values may converge to the same middle values and the quality of the images may both improve and enhance in detail.

Method may also including slicing one or more images. Current limitations to processing full size (2000×2000) images include hardware limitations. Rather than downsizing images, methods as described herein include cropping the images containing one or more lesions. After preprocessing the images, the approximate center of one or more lesion coordinates may be located and the images may be cropped into two different sizes: 60×60 pixels and 420×420 pixels. Each size represents a specific dataset. In some embodiments, the images may be obtained by cropping the images with and without the lesion in the center, once. A first dataset may be referred to as dataset A, as shown in Table 5. Unbalanced data are shown with the majority of the cases in normal patients, which is an expected distribution due to the prevalence of DR. Training, tests, and validation cases for class 0 consist of cropped images of normal images that include all the areas of the retina.

TABLE 5

Dataset A.

| | 60 × 60 | | | 420 × 420 | | |
|---|---|---|---|---|---|---|
| | Train | Validation | Testing | Train | Validation | Testing |
| Normal | 10,977,063 | 453,808 | 8,240,000 | 194,276 | 8,007 | 194,260 |
| Mild | 4,520 | 485 | 1,881 | 4,522 | 485 | 1,887 |

In some embodiments, the size of the training data may be increased as shown in Table 6, dataset B. The set may be utilized to evaluate whether increasing the number of new pictures or increasing the number of cropped images that include lesions using augmentation affect accuracy. To obtain a final result, all training cases may be joined, including annotated and augmented cases together, as shown in Table 7, and labeled as set dataset C. In datasets B and C, the cases in the normal class may be the same as in dataset A.

TABLE 6

Dataset B.

| | Increasing training cases | |
|---|---|---|
| | With new pictures | With augmentation |
| 60 × 60 | 7,072 | 15,798 |
| 420 × 420 | 6,990 | 15,765 |

TABLE 7

Dataset C.

| | Image size | |
|---|---|---|
| | 60 × 60 | 420 × 420 |
| Total images | 41,654 | 42,259 |

As previously stated, the systems and methods described herein may employ a convolutional neural network architecture. Two independent types of architecture for the datasets (e.g., the 60×60 sets in Table 8 and the 420×420 sets in Table 9) may be created. The tables show the input size of each layer, the filter size, and the number of filters (kernels). Model A is a classic CNN model whereas model B is a version of Visual Geometric Group (VGG). Implementing classical VGG that includes more convolutions in each layer would dramatically reduce the size of the training batch in the 420×420 models, an unwanted side effect.

For all of the models, one stride for the filters and padding may be implemented. In the disclosed architecture, fractional max pooling may be implemented due to the fact that the image sizes can be downsampled gradually. In embodiments, the dropout rate may be 0.1, the activation function may be leaky ReLU, the Microsoft Research approach may be chosen for the weight initialization, and batch normalization may be performed after each convolution layer.

TABLE 8

Models for 60 × 60 set.

| Input size | Model A | | Model B | |
|---|---|---|---|---|
| 60 | 3 × 3 | 64 | 3 × 3 | 64 |
| | | | 3 × 3 | 64 |
| | FracMaxPool → BatchNorm → LeReLU | | | |
| 45 | 3 × 3 | 128 | 3 × 3 | 128 |
| | | | 3 × 3 | 128 |
| 30 | 3 × 3 | 256 | 3 × 3 | 256 |
| | | | 3 × 3 | 256 |
| 23 | 3 × 3 | 512 | 3 × 3 | 512 |
| | | | 3 × 3 | 512 |
| 15 | 3 × 3 | 1024 | 3 × 3 | 1024 |
| | | | 3 × 3 | 1024 |
| 9 | 3 × 3 | 128 | 3 × 3 | 1536 |
| | | | 3 × 3 | 1536 |
| 5 | 3 × 3 | 2048 | 3 × 3 | 2048 |
| | | | 3 × 3 | 2048 |
| Dropout | | | | |
| Full connected layers | | | 2048 | |
| Full connected layers | | | 2048 | |
| Full connected layers | | | 1024 | |
| Log soft max → negative log likelihood | | | | |

TABLE 9

Models for 420 × 420 set.

| Input size | Model A | | Model B | |
|---|---|---|---|---|
| 420 | 3 × 3 | 32 | 3 × 3 | 32 |
|  |  |  | 3 × 3 | 32 |
|  | FracMaxPool → BatchNorm → LeReLU | | | |
| 360 | 3×3 | 48 | 3 × 3 | 48 |
|  |  |  | 3 × 3 | 48 |
| 300 | 3 × 3 | 46 | 3 × 3 | 64 |
|  |  |  | 3 × 3 | 64 |
| 240 | 3 × 3 | 72 | 3 × 3 | 72 |
|  |  |  | 3 × 3 | 72 |
| 180 | 3 × 3 | 96 | 3 × 3 | 96 |
|  |  |  | 3 × 3 | 96 |
| 120 | 3 × 3 | 128 | 3 × 3 | 128 |
|  |  |  | 3 × 3 | 128 |
| 60 | 3 × 3 | 48 | 3 × 3 | 190 |
|  |  |  | 3 × 3 | 190 |
| 45 | 3 × 3 | 256 | 3 × 3 | 256 |
|  |  |  | 3 × 3 | 256 |
| 30 | 3 × 3 | 348 | 3 × 3 | 348 |
|  |  |  | 3 × 3 | 348 |
| 23 | 3 × 3 | 512 | 3 × 3 | 512 |
|  |  |  | 3 × 3 | 512 |
| 15 | 3 × 3 | 1024 | 3 × 3 | 1024 |
|  |  |  | 3 × 3 | 1024 |
| 9 | 3 × 3 | 1536 | 3 × 3 | 1536 |
|  |  |  | 3 × 3 | 1536 |
| 5 | 3 × 3 | 2048 | 3 × 3 | 2048 |
|  |  |  | 3 × 3 | 2048 |
| Dropout | | | | |
| Full connected layers | | | 2048 | |
| Full connected layers | | | 2048 | |
| Full connected layers | | | 1024 | |
| Log soft max → negative log likelihood | | | | |

Figure 8:
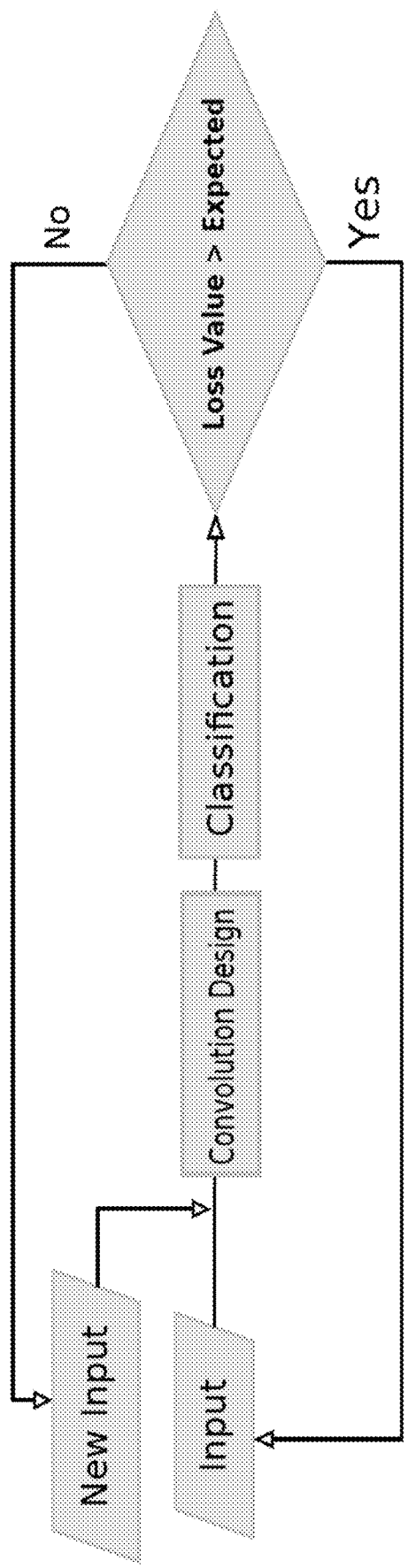
FIG. 8 illustrates a feedback loop according to embodiments of the disclosure.

Finally, a feedback method for increasing the accuracy of the CNN 420×420 pixel input model is disclosed. FIG. 8 illustrates a feedback loop according to embodiments of the disclosure. Qualitative improvement of the image not only facilitates the detection of the lesions for annotations, but also decreases the number of epochs needed to reach a high accuracy for training and validation sets. Because the colors of microaneurysms are located between 650 and 570 nm in the light spectrum and it is not possible to find cyan colored microaneurysms, color reduction plays a significant role in medical images where its variance is limited. As an illustration, the function in Eq. (3) may be successfully applied to enhance the lesions and provide contrast against their surroundings. The benefits of shortening the training time are economic, environmental, and human and can be reflected in the cost reduction.

The difference of the values between the current loss function and that of the prior batch >0 indicates that the current batch did not classify as well as the previous batch. This is the basis of the feedback function. The function created for the feedback detects the batch in which the current difference of the values of the cost function surpasses the moving average of the mean of the differences of the previous batches. The polynomial function utilized in a feedback module as described herein may be as follows:

$$cve = bn^4 \times (-1.41e-20) + bn^3 \times (2.08e-15) + bn^2 \times (9.84e-11) + bn \times 6.27e-07 + (1.50e-01), \quad (4)$$

where bn is the batch number and cve is the cost value expected. If the cost value of the batch during the training is greater than expected it to be after applying Eq. (4), same batch may be presented for retraining, as shown in FIG. 8.

The method may further include monitoring the datasets for retraining. In some embodiments, the loss and accuracy of the training, the validation, and the testing sets may be utilized to select the most efficient model. After training the more accurate CNN model, the weights of the trained CNN at regular intervals may be kept. Using those weights, the probability of each image in the testing sets may be obtained. Then, ROC analysis may be utilized to get the cutoff of the probability values utilized to receive the maximum specificity or sensitivity of the 420.times.420 or 60.times.60 sets, respectively. Finally, the most accurate weights of the CNNs given by the ROC analysis may be utilized to obtain the probabilities of the diabetic retinopathy database and evaluation protocol, which may be utilized to compare the overall probabilities to the ground truth. OptimalCutpoints from Rcran may be utilized to obtain the optimal points of the max sensitivity and specificity and calculate the Youden's Index.

Figure 9:
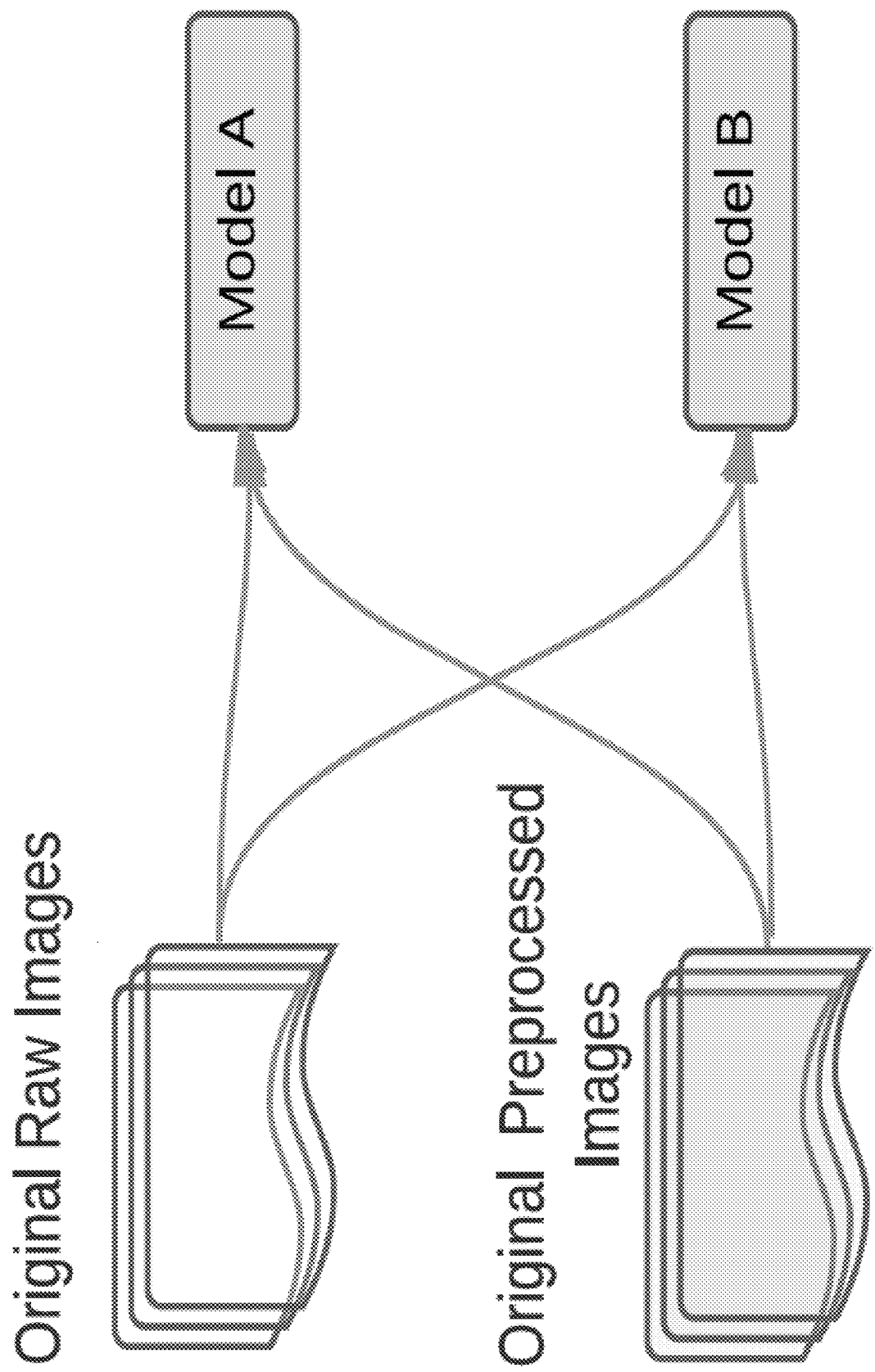
FIG. 9 is a diagram illustrating raw versus preprocessed images for two models according to embodiments of the disclosure.

FIG. 9 is a diagram illustrating raw versus preprocessed images for two models according to embodiments of the disclosure. Initially, CNN performance in models A and B may be evaluated using both raw data and preprocessed images from dataset A (Table 5), as displayed in FIG. 9. Here, the accuracy of the confusion table may be evaluated in the training and validation sets, by changing the quality in the input phase and the model in the architecture phase. The more accurate model and image set are utilized for the next stage.

Figure 10:
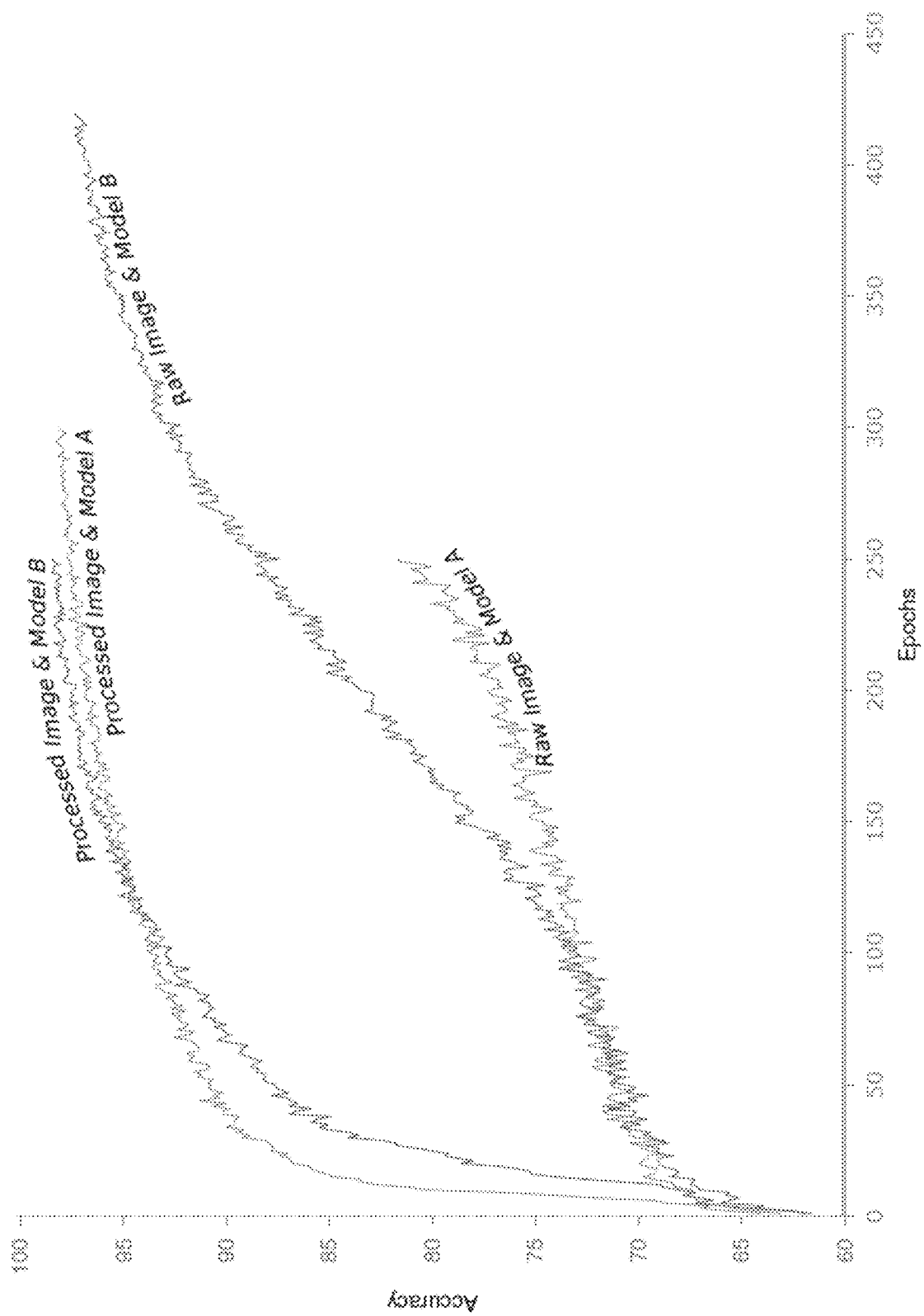
FIG. 10 is a graph illustrating the contingency table and the accuracy plot of images with a size of 420×420 in a training set according to embodiments of the disclosure.

Table 10 and FIG. 10 display the contingency table and the accuracy plot of the images with a size of 420×420 in the training set. Preprocessed images trained with model B reached a better accuracy with less epochs than the other models as shown in Table 10. Specifically, FIG. 10 is a graph illustrating the contingency table and the accuracy plot of images with a size of 420×420 in a training set. It is also illustrated that processed images perform better than raw images, and that all images and models could reach a similar accuracy if the number of epochs increases. When using raw images for model A, the training may be suspended, due to the slow increase in the slope. In some embodiments, processed images may reach 90 in accuracy in the first 100 epochs and the slope may be steeper in the first 50 epochs.

TABLE 10

Raw versus preprocessed images for models A and B with size 420 × 420.

| | | Predictions: percentage by row | | | | | | | |
|---|---|---|---|---|---|---|---|---|---|
| | | Standard CNN | | | | VGG CNN | | | |
| | | Raw images-250 epochs | | Processed images-300 epochs | | Raw images-365 epochs | | Processed images-250 epochs | |
| | | Mild | Normal | Mild | Normal | Mild | Normal | Mild | Normal |
| True | Mild | 84.431 | 15.569 | 98.6831 | 1.369 | 97.851 | 2.149 | 98.722 | 1.278 |
| | Normal | 21.092 | 78.908 | 2.244 | 97.756 | 3.254 | 96.746 | 1.77 | 98.230 |

Figure 11:
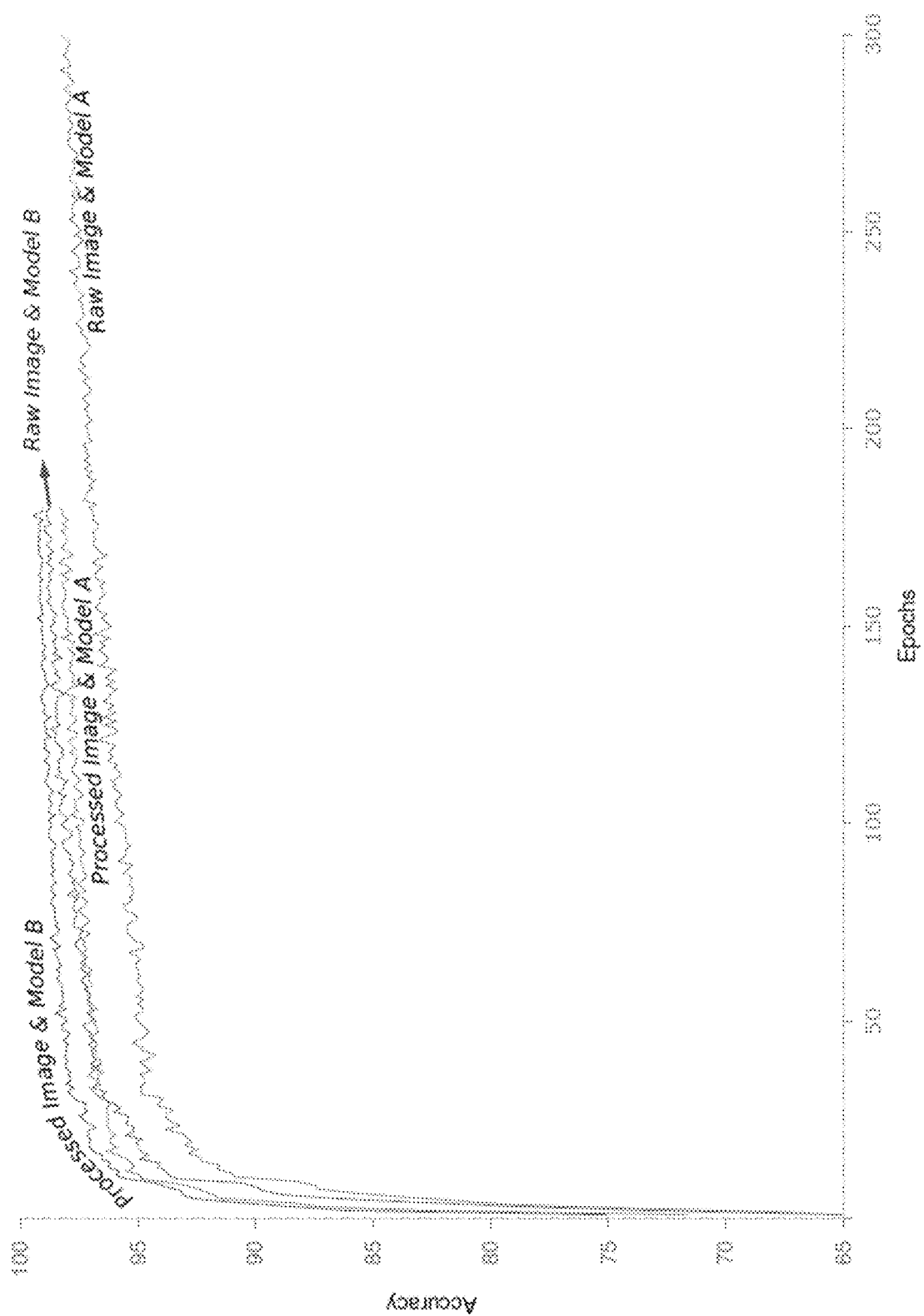
FIG. 11 is a graph illustrating the contingency table and the accuracy plot of the 60×60 image sets in the training set according to embodiments of the disclosure.

Table 11 and FIG. 11 show the contingency table and the accuracy plot of the 60×60 image sets in the training set. Specifically, FIG. 11 is a graph illustrating raw versus preprocessed images for models A and B with size 60×60. It is evident that model B performed better than model A, and that model A reaches a similar accuracy with raw pictures than the other models, but only after a long training (300 epochs). It is also noticeable that most of the accuracy may be achieved in the first 50 epochs using processed images, with a steeper slope in the first 20 epochs.

TABLE 11

Raw versus preprocessed images for models A and B with size 60 × 60.

| | | Predictions: percentage by row | | | | | | | |
|---|---|---|---|---|---|---|---|---|---|
| | | Standard CNN | | | | VGG CNN | | | |
| | | Raw images-300 epochs | | Processed images-180 epochs | | Raw images-180 epochs | | Processed images-180 epochs | |
| | | Mild | Normal | Mild | Normal | Mild | Normal | Mild | Normal |
| True | Mild | 98.581 | 1.419 | 98.576 | 1.424 | 99.234 | 0.766 | 99.343 | 0.657 |
| | Normal | 2.08 | 97.920 | 1.841 | 98.159 | 1.714 | 98.286 | 1.269 | 98.731 |

Comparing the 60×60 image set to the 420×420 image set, the first reaches a higher accuracy in all the models with less training. In addition, it is visible that model B outperforms model A. For the next step, model B and preprocessed images may be chosen.

In addition, the impact of preprocessing images may be evaluated on the training time. Table 12 shows a significant reduction in the training time of the processed images compared to the training time of the raw images.

TABLE 12

Processing times in raw versus processed images.

| Input size | Raw images | Processed images |
|---|---|---|
| 420 × 420 | 8 days | 4 days |
| 60 × 60 | 24 h | 12 |

Figure 12:
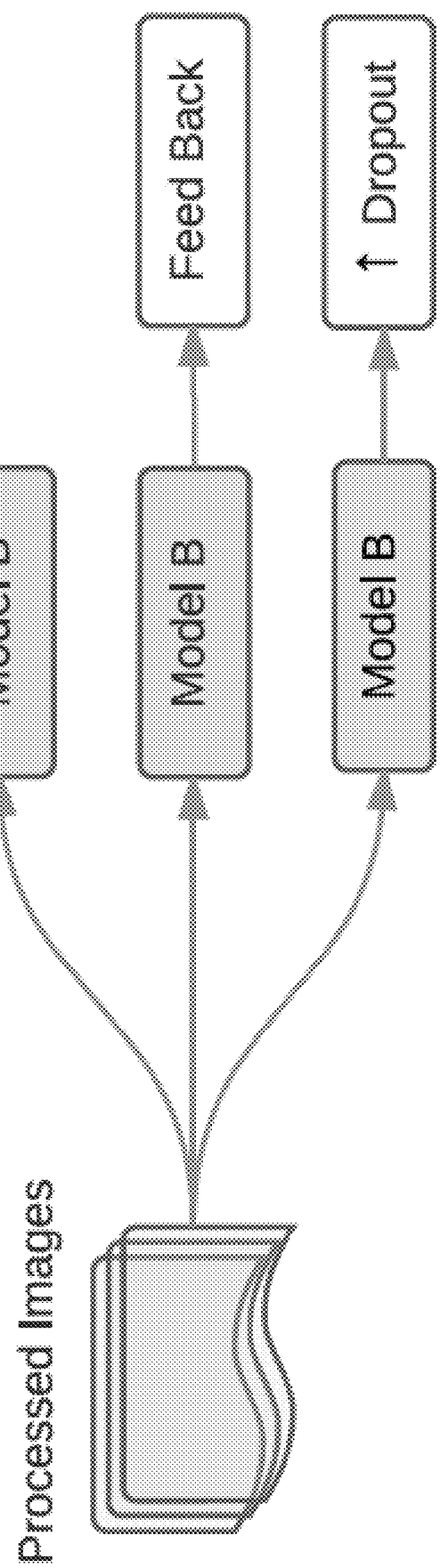
FIG. 12 is a flow diagram illustrating feedback versus dropout according to embodiments of the disclosure.

Method may include modifying the classification and training of one or more images. FIG. 12 is a flow diagram illustrating feedback versus dropout. FIG. 12 shows a stage that compares the effects of feedback in preprocessed images using model B against an increase in the dropout layers and dropout probability to 0.5 in the preprocessed images. Here, the effects of making changes in the classification phase versus training phase in sensitivity and specificity may be identified using training and testing sets from dataset A.

Figures 13A, 13B:
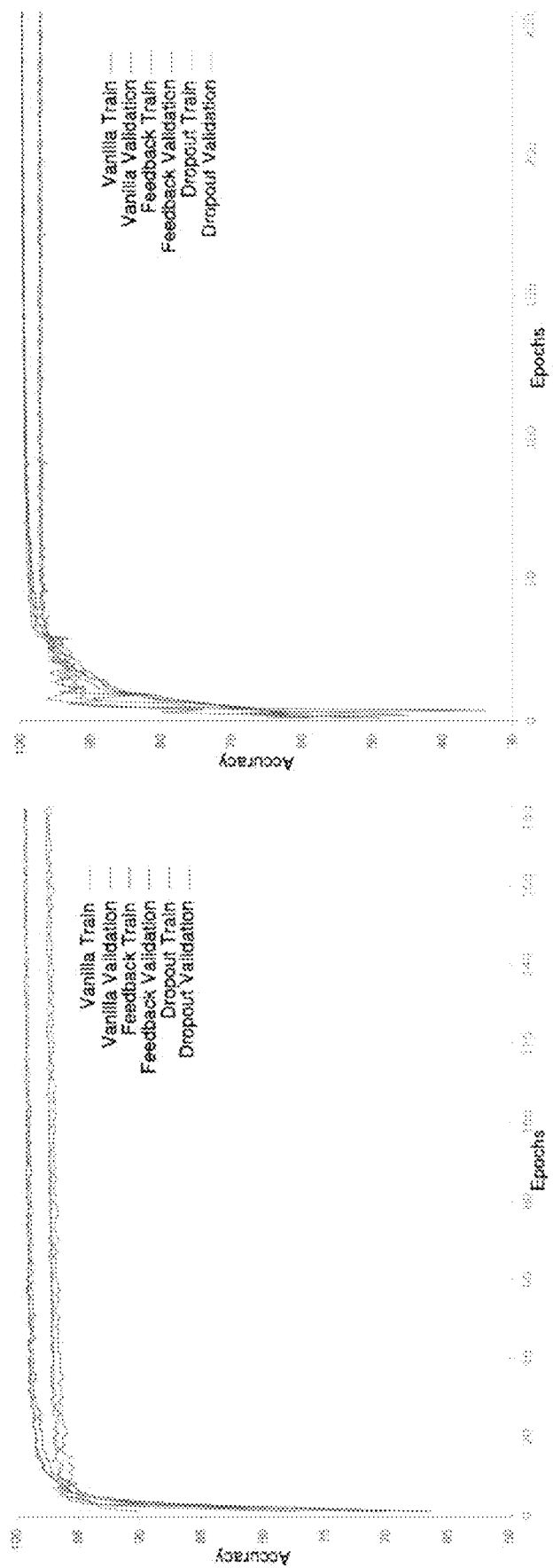
FIGS. 13A-13B show graphs further illustrating feedback versus dropout accuracy with image sizes (a) 60×60 and (b) 420×420 according to embodiments of the disclosure.

FIG. 13 is a graph further illustrating feedback versus dropout accuracy with image sizes (a) 60×60 and (b) 420×420. FIG. 13 shows the absence of significant differences in accuracy between the training using model B with a dropout probability of 0.1 (vanilla), the training increasing the dropout probability to 0.5 and dropout layers, and the training increasing the feedback in both the 60×60 and 420×420 sets.

The accuracy is over 95 for all of the sets, and overfitting is presented in the validation sets. For a 60×60 set, the crossing point between the training and testing lines using the validation set is reached when the accuracy is 90 for the 60×60 set and 82 for the 420×420 set.

Tables 13 and 14 show the values of the sensitivity and specificity of the training and test sets in dataset A. The sensitivity and specificity of the 60×60 images may be satisfactory for both sets with a small decrease in the values compared to the training set. Also, a higher sensitivity is visible in test sets when increasing the dropout. However, for the 420×420 sets, the sensitivity decreased significantly, becoming more prominent when increasing the dropout layers and probability.

TABLE 13

Feedback versus increasing dropout on training set.

| | 60 × 60 180 epochs | | | 420 × 420 250 epochs | | |
|---|---|---|---|---|---|---|
| | Vanilla | Feedback | Dropout | Vanilla | Feedback | Dropout |
| Sensitivity | 99 | 99 | 99 | 99 | 99 | 98 |
| Specificity | 99 | 99 | 98 | 97 | 97 | 99 |

TABLE 14

Feedback versus increasing dropout on testing set.

|  | 60 × 60 180 epochs | | | 420 × 420 250 epochs | | |
| --- | --- | --- | --- | --- | --- | --- |
|  | Vanilla | Feedback | Dropout | Vanilla | Feedback | Dropout |
| Sensitivity | 92 | 92 | 96 | 62 | 67 | 61 |
| Specificity | 99 | 99 | 98 | 97 | 97 | 99 |

Note that the training may continue even after overfitting is detected and that the weights utilized to get those values belonged to the last epoch in training.

Method may further include increasing the sensitivity and specificity in the 420×420 set. To accomplish such an increase in sensitivity and the preprocessed images, model B, and feedback mechanism may be utilized.

Figure 14:
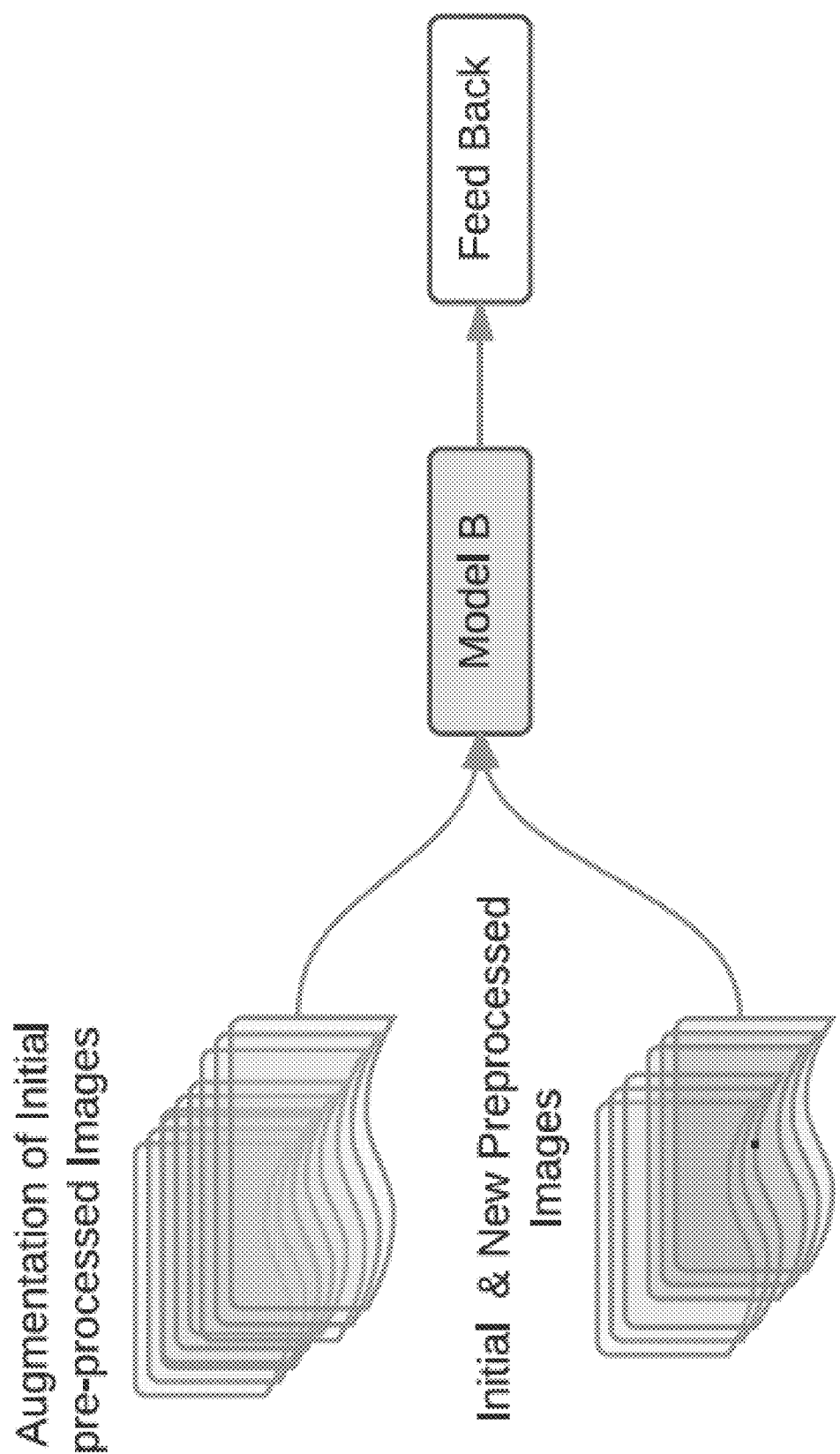
FIG. 14 is a flow diagram illustrating augmentation versus new images according to embodiments of the disclosure.

Method may include modifying input quantity. FIG. 14 is a flow diagram illustrating augmentation versus new images. FIG. 14 shows the design comparing the changes corresponding to increases in size of input by using augmentation against increases in size of input by adding new images to the dataset (dataset B), where the previous stage performed better in the 420×420 set. The performance is evaluated by measuring the sensitivity and specificity of the testing set using different epochs.

Figure 15:
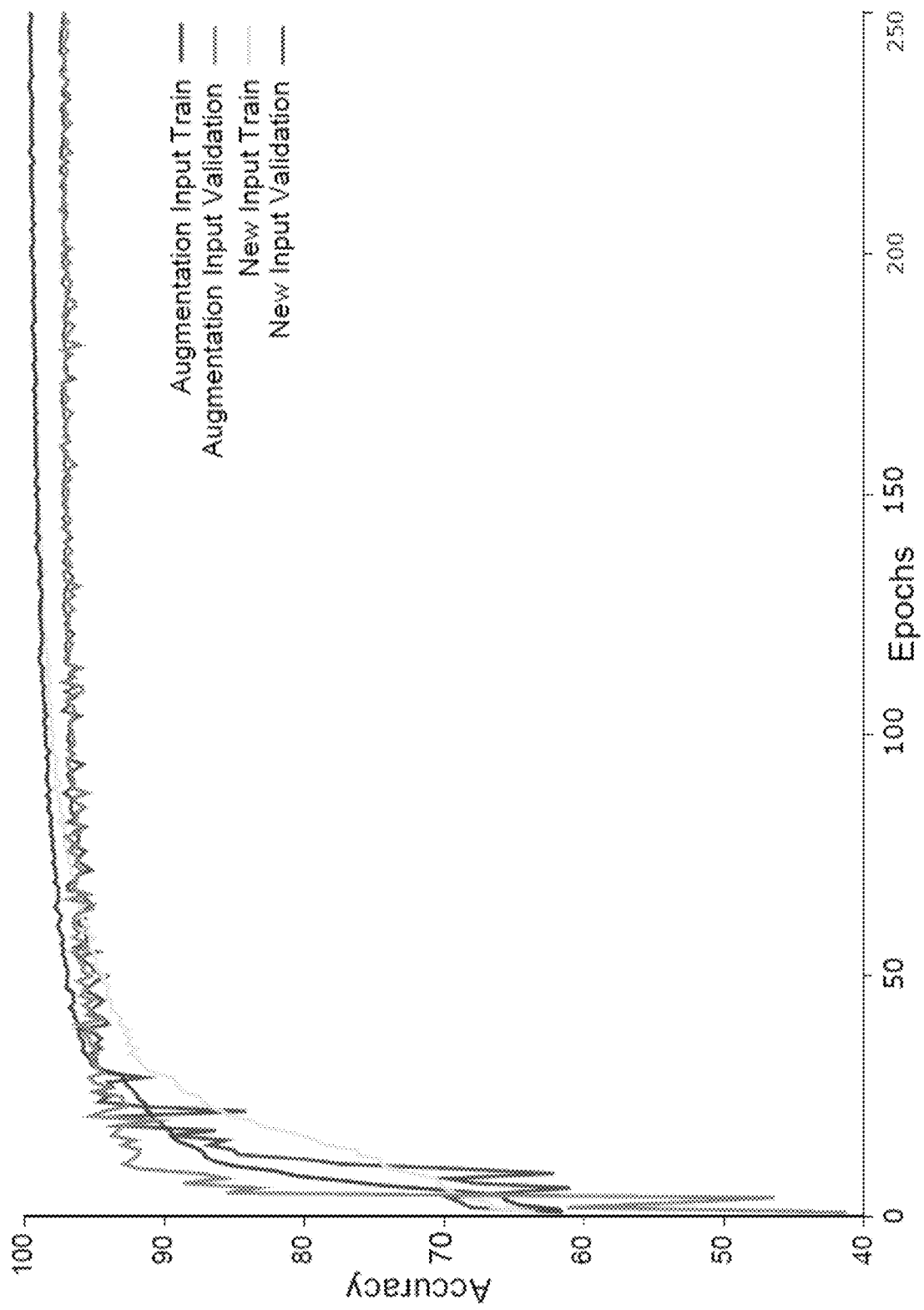
FIG. 15 is a graph further illustrating the accuracy plot of the training set according to embodiments of the disclosure.

Of the new cases provided by the Messidor dataset, 1276 may be added to the 60×60 set and 1199 may be added to the 420×420 set. Dataset B consists of the new cases and cropped images with the lesion not centered. The augmentation set consists of images from dataset A and six cropped images with the lesion not centered assuring that the images are completely different. FIG. 15 is a graph further illustrating the accuracy plot of the training set. The accuracy plot of the training set in FIG. 15 shows that the input augmentation reached a higher accuracy than the new input at the beginning of the training, but at the end of the process both achieved a similar accuracy. The plot also displays overfitting on validation sets for both the input augmentation and the new input sets. In addition, FIG. 15 shows a difference in the crossing point between the training and the validation sets, by taking more epochs, when using the new input. The sensitivity increases dramatically in both sets by adding either new data or using input augmentation in the testing sets as shown in Table 15. This increase is larger in input augmentation compared to the new input.

TABLE 15

Input augmentation versus new input: sensitivity and specificity 420 × 420.

|  |  | Augmentation | | New input | |
| --- | --- | --- | --- | --- | --- |
|  |  | Sensitivity | Specificity | Sensitivity | Specificity |
| Epochs | 50 | 82 | 94 | 79 | 94 |
|  | 100 | 79 | 96 | 76 | 97 |
|  | 150 | 73 | 98 | 71 | 98 |
|  | 200 | 68 | 99 | 72 | 99 |
|  | 250 | 74 | 99 | 72 | 99 |

Figure 16:
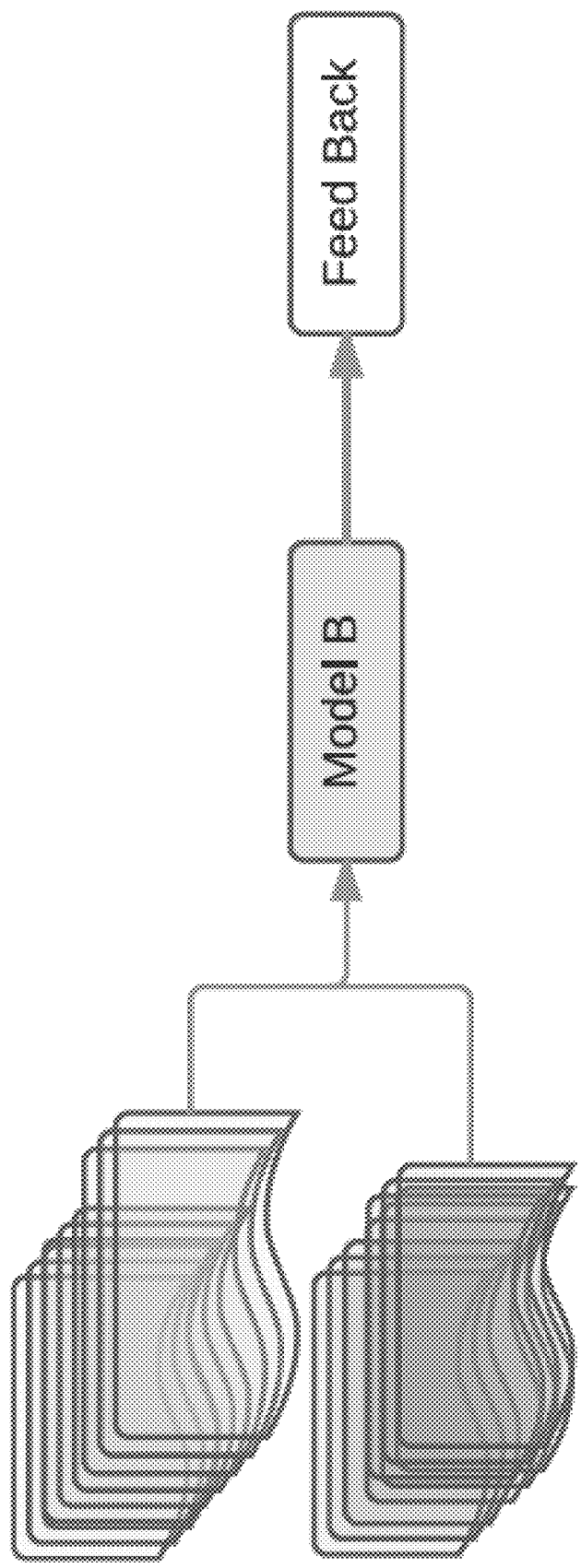
FIG. 16 is a flow diagram illustrating a final input, with a lesion dispersed in different regions of the image according to embodiments of the disclosure.

FIG. 16 is a flow diagram illustrating a final input, with a lesion dispersed in different regions of the image. With the original and new inputs, a new dataset, dataset C, may be created, which contains the original images and the same images cropped by a factor of 10 with the lesion dispersed in different regions of the image as shown in FIG. 16. Dataset C may be trained with model B and feedback. The weights for every 50 epochs in images that have a size of 420×420 and the weights for every 20 epochs in images that have a size of 60×60 may be kept.

Figures 17A, 17B:
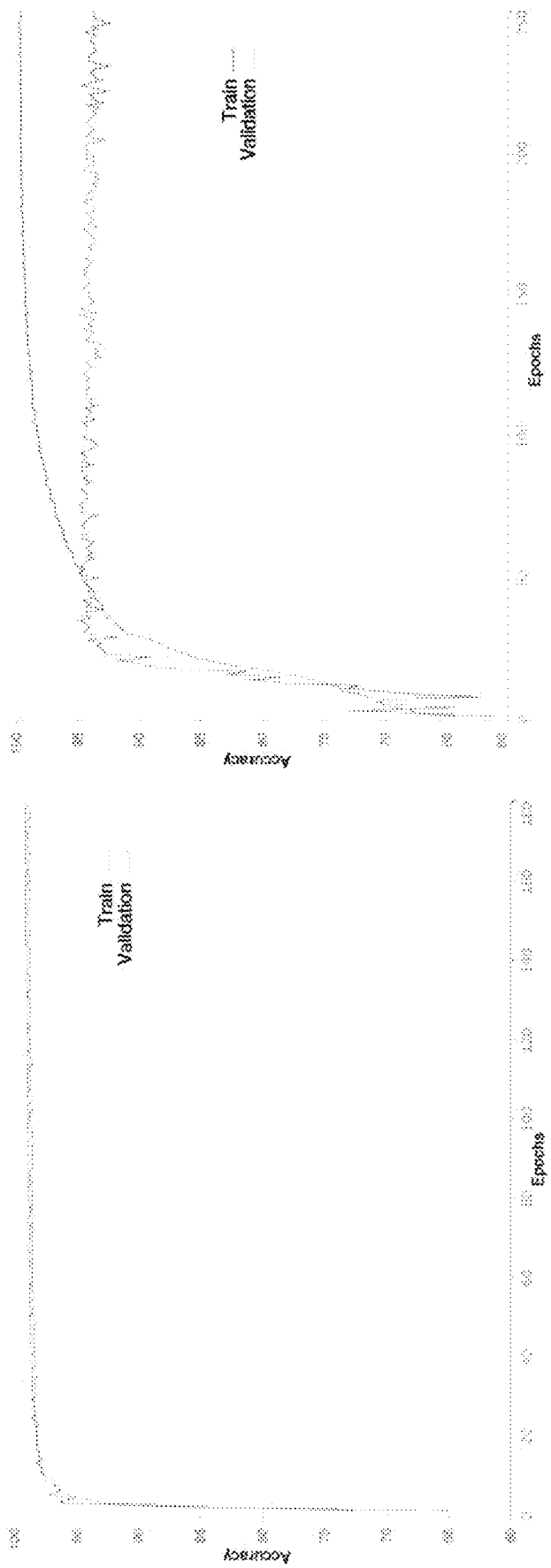
FIGS. 17A-17B show graphs further illustrating the final input accuracy of training dataset C with model B and feedback according to embodiments of the disclosure.

FIG. 17 is a graph further illustrating the final input accuracy of training dataset C with model B and feedback. The accuracy of training dataset C with model B and feedback is shown in FIG. 17. Images that have a size of 60×60 will reach a higher accuracy than images with a size of 420×420. In addition, overfitting is more prominent in the 420×420 image sets.

Modifications in the input, convolution design, classification, and training phase that would improve sensitivity and specificity in the training, validation, and testing sets may be selected. Subsequently, dataset C may be trained with all the previous modifications, to obtain the weights that performed best in the testing sets and the cut-off point values provided by ROC analysis to achieve the optimal sensitivity and specificity. Finally, the diabetic retinopathy database and evaluation protocol dataset may be tested and the results compared to their own ground truth.

In the 420×420 set, applying feedback to the CNN performed better than other techniques, such as vanilla and dropout increasing. A batch with mild and normal classes that perform poorly after back-propagation may be located and retrained. In such embodiments of the method, values of the loss function per batch may be calculated or derived during all of the training in order to calculate the function. In some embodiments, a dynamic process may be generated that uses a number of previous batches to get the threshold and update it after a certain number of batches. For instance, a feedback method that assigns a probability score to each pixel and is modified when "the probability scores differ the most from the initial reference level," so the higher the weight probability the higher the chance of it being selected may be utilized. Such an exemplary method may be applied to the negative sample.

Table 16 shows the sensitivity and specificity acquired with having the weights at different epochs in the test dataset. The highest sensitivity and specificity are reached with weights of epochs 40 and 50 in the 60×60 and 420×420 sets and are more accurate than those shown in Table 15. A decrease in the sensitivity of both sets occurs with a higher number of epochs as presented in Table 16. This supports the overfitting findings in the validation set depicted in FIG. 17. The weights that produce the best sensitivity for the 420×420 set and the best specificity for the 60×60 set may be selected for subsequent phases of the method.

TABLE 16

Final input: sensitivity and specificity.

|  |  | 60 × 60 | | |  | 420 × 420 | |
| --- | --- | --- | --- | --- | --- | --- | --- |
|  |  | Sensitivity | Specificity |  |  | Sensitivity | Specificity |
| Epochs | 20 | 93 | 97 | Epochs | 50 | 88 | 95 |
|  | 40 | 93 | 98 |  | 100 | 79 | 98 |
|  | 60 | 91 | 98 |  | 150 | 75 | 99 |
|  | 80 | 92 | 98 |  | 200 | 76 | 99 |
|  | 100 | 91 | 98 |  | 250 | 71 | 99 |
|  | 120 | 90 | 98 |  |  |  |  |
|  | 140 | 92 | 99 |  |  |  |  |
|  | 160 | 91 | 98 |  |  |  |  |
|  | 180 | 91 | 98 |  |  |  |  |

Table 17 shows the sensitivity of the testing set for images with an input size of 420×420 in different datasets. An increase in the sensitivity using the weights of the CNN results after training these images with datasets A, B, and C.

TABLE 17

Sensitivity for 420 × 420 image sizes on different datasets, epoch 50, model VGG, and processed images.

| Dataset A | | | | Dataset B | Dataset C | |
|---|---|---|---|---|---|---|
| | | | | New | Cutoff | Cutoff |
| Vanilla | Feedback | Dropout | Augmentation | Input | 0.5 | 0.32 |
| 62 | 67 | 61 | 82 | 79 | 88 | 91 |

Figure 18:
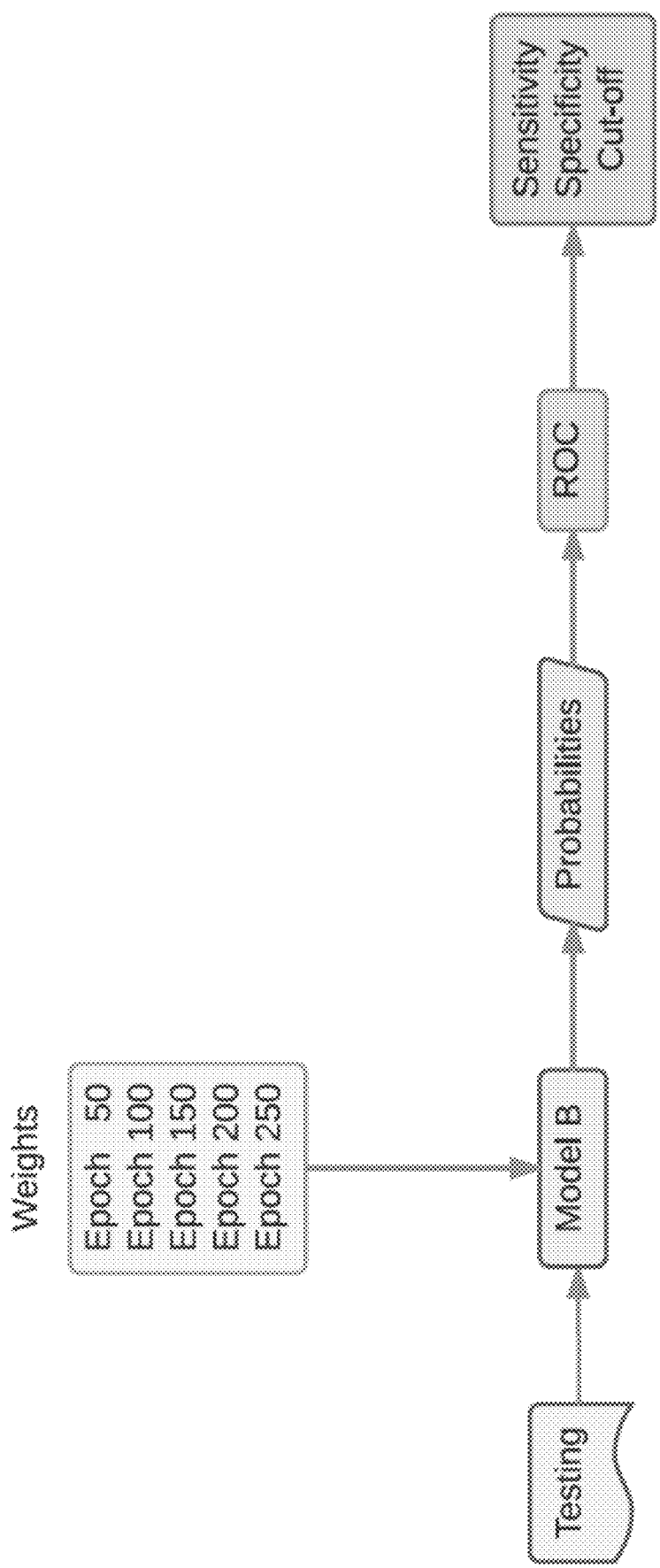
FIG. 18 is a flow diagram illustrating the sensitivity, specificity, and optimal cut-point values obtained by applying ROC to the testing set according to embodiments of the disclosure.

FIG. 18 is a flow diagram illustrating the sensitivity, specificity, and optimal cut-point values obtained by applying ROC to the testing set. After having run the CNN in the testing set and finding the probability of each image in each category (normal and microaneurysms), the sensitivity, specificity, and optimal cutoff point values may be obtained by applying a Receiver Operation Characteristics (ROC) analysis to the testing set as shown in FIG. 18. The CNN model according to embodiments of the disclosure may be run with the weights that provided the best accuracy and sensitivity in the diabetic retinopathy database and evaluation dataset to determine how the model performed overall.

Table 18 shows that for the 60×60 set, the values of the sensitivity and specificity are similar at different cutoff points, with epoch 80 providing a slightly higher specificity. For the 420×420 dataset, epoch 50 displays the best accuracy and sensitivity. Those weights may be utilized for further analysis.

TABLE 18

ROC cutoff.

| | | Cutoff | Sensitivity | Specificity | Accuracy |
|---|---|---|---|---|---|
| | | | 60 × 60 | | |
| Epochs | 20 | 0.27 | 95 | 97 | 96 |
| | 40 | 0.18 | 95 | 97 | 96 |
| | 60 | 0.09 | 95 | 97 | 96 |
| | 80 | 0.13 | 95 | 98 | 96 |
| | 100 | 0.06 | 95 | 97 | 96 |
| | 120 | 0.06 | 95 | 97 | 95 |
| | 140 | 0.11 | 95 | 97 | 95 |
| | 160 | 0.05 | 95 | 97 | 95 |
| | 180 | 0.04 | 95 | 97 | 95 |
| | | | 420 × 420 | | |
| Epochs | 50 | 0.32 | 91 | 93 | 91 |
| | 100 | 0.02 | 90 | 93 | 91 |
| | 150 | 0.01 | 89 | 93 | 90 |
| | 200 | 0.01 | 89 | 94 | 90 |
| | 250 | 0.01 | 88 | 93 | 90 |

Figures 19A, 19B:
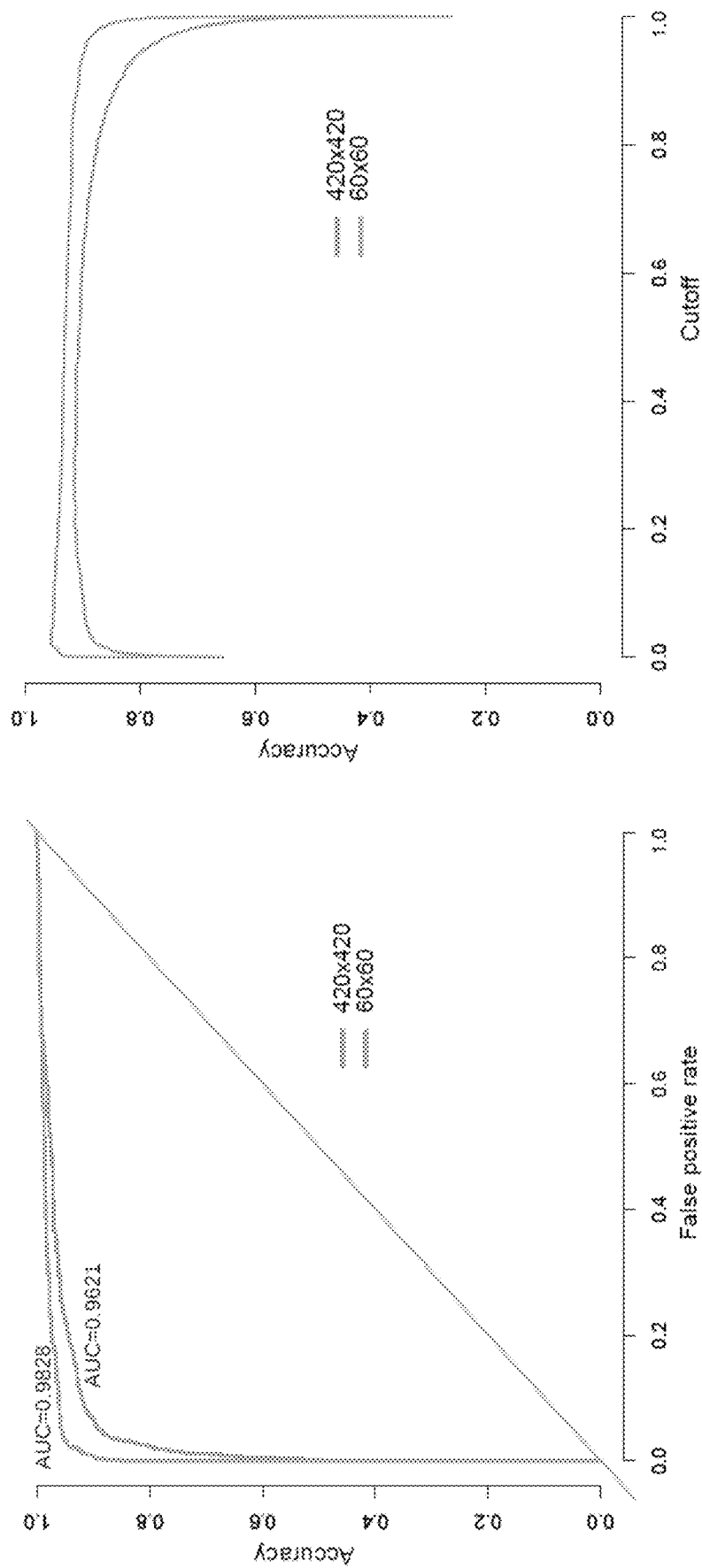
FIGS. 19A-19B show graphs illustrating a ROC analysis, with an area under the curve of 0.9828 and 0.9621 for the 60×60 and 420×420 datasets according to embodiments of the disclosure.
Figure 20A:
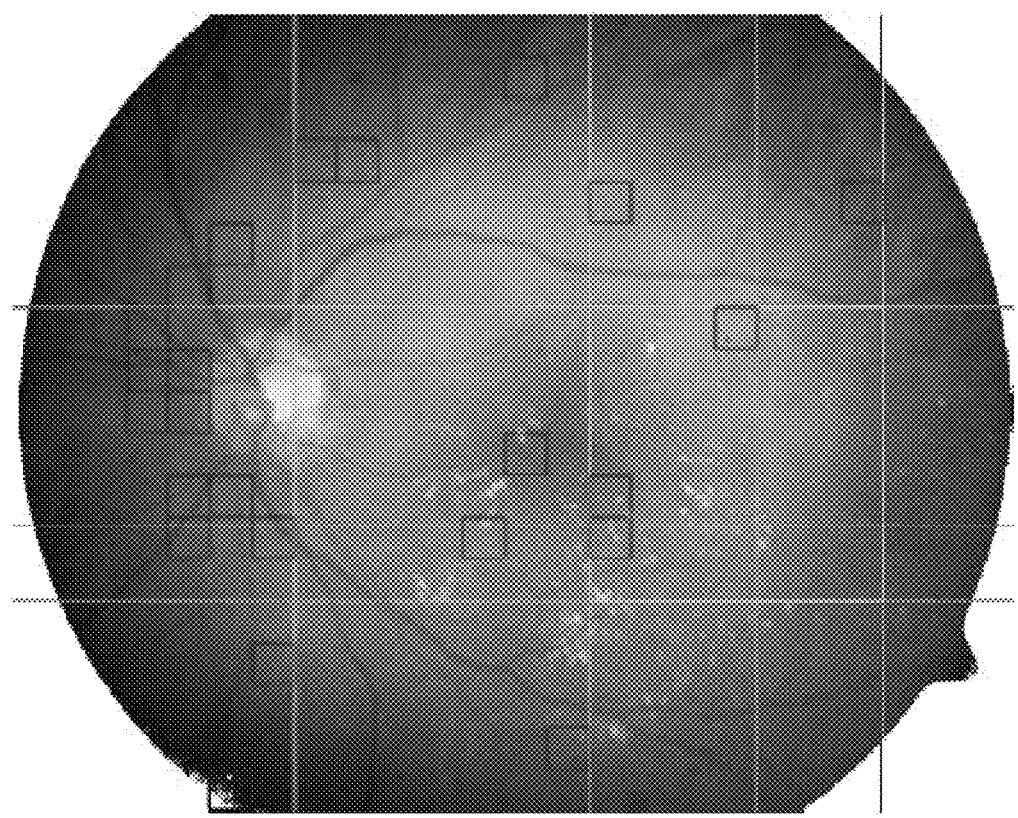
FIGS. 20A-20C illustrate examples of a final result according to embodiments of the disclosure.
Figure 20A:
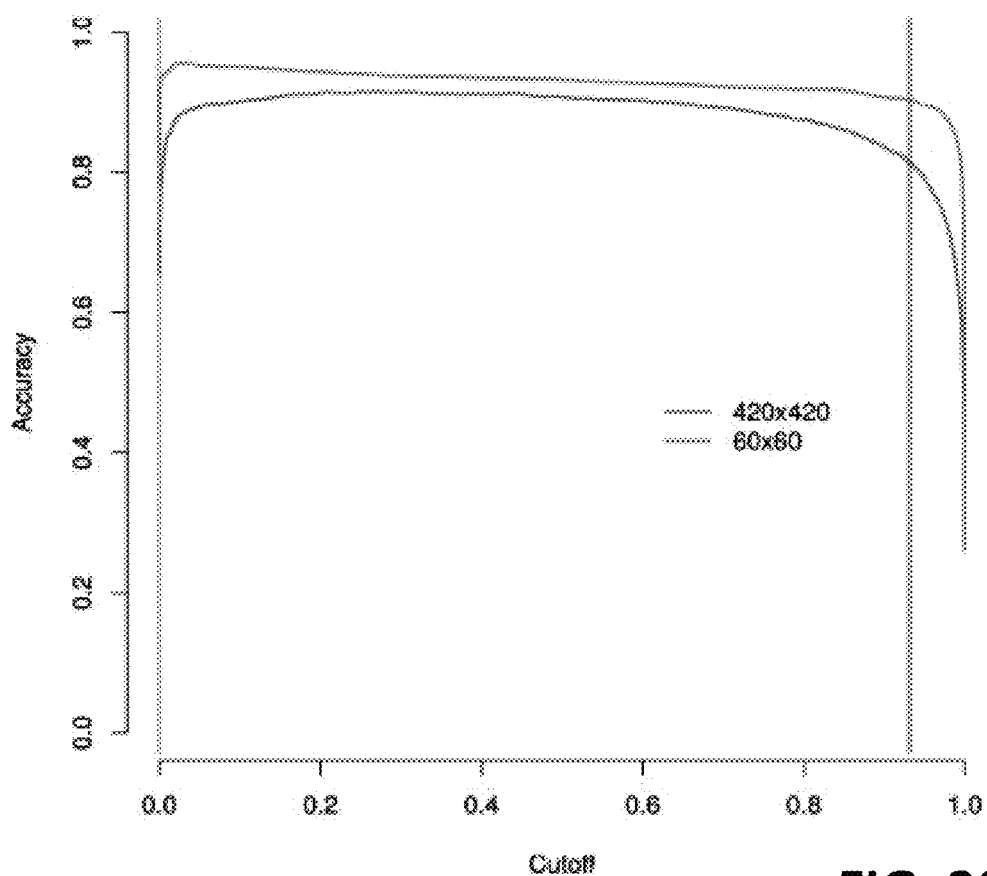
Figure 20B:
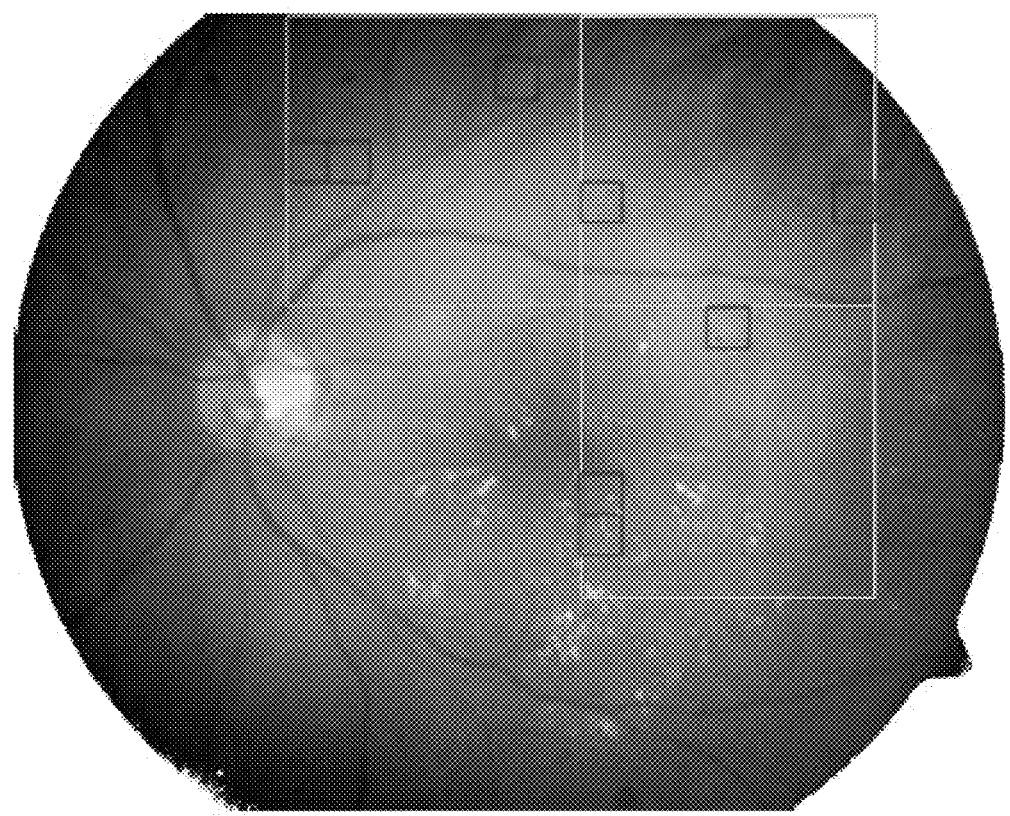
Figure 20B:
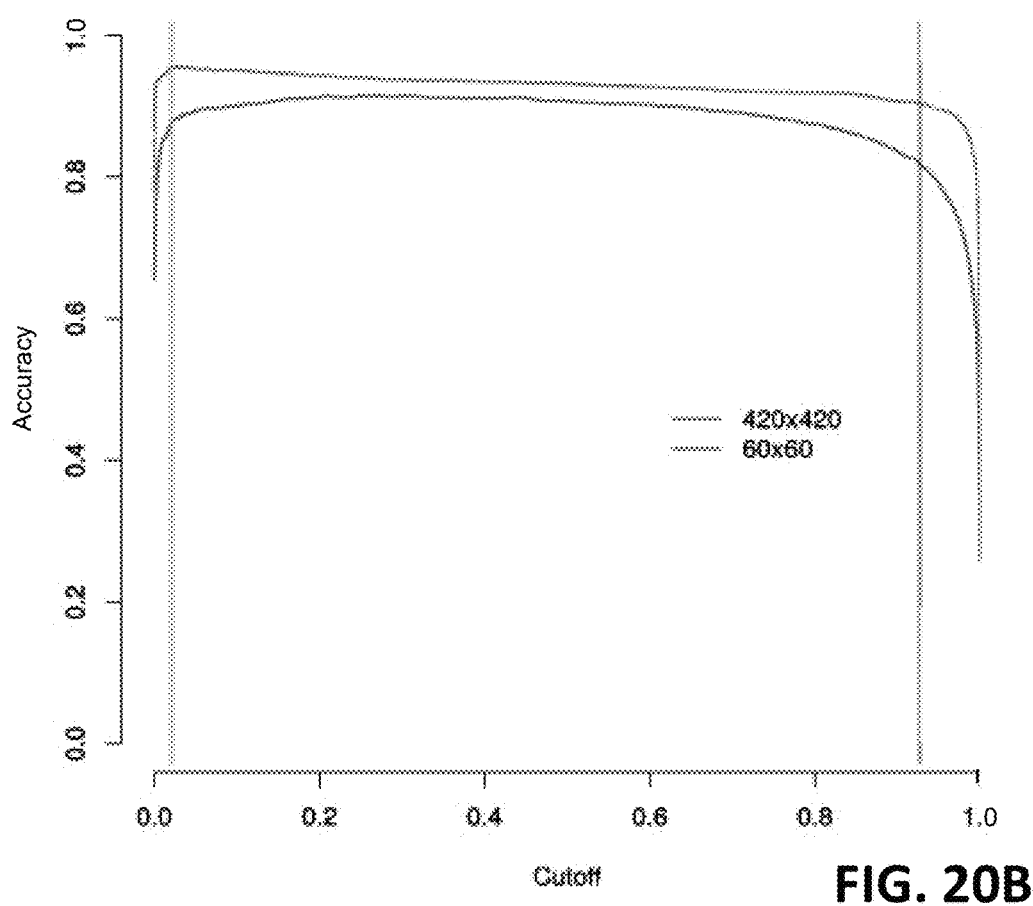
Figure 20C:
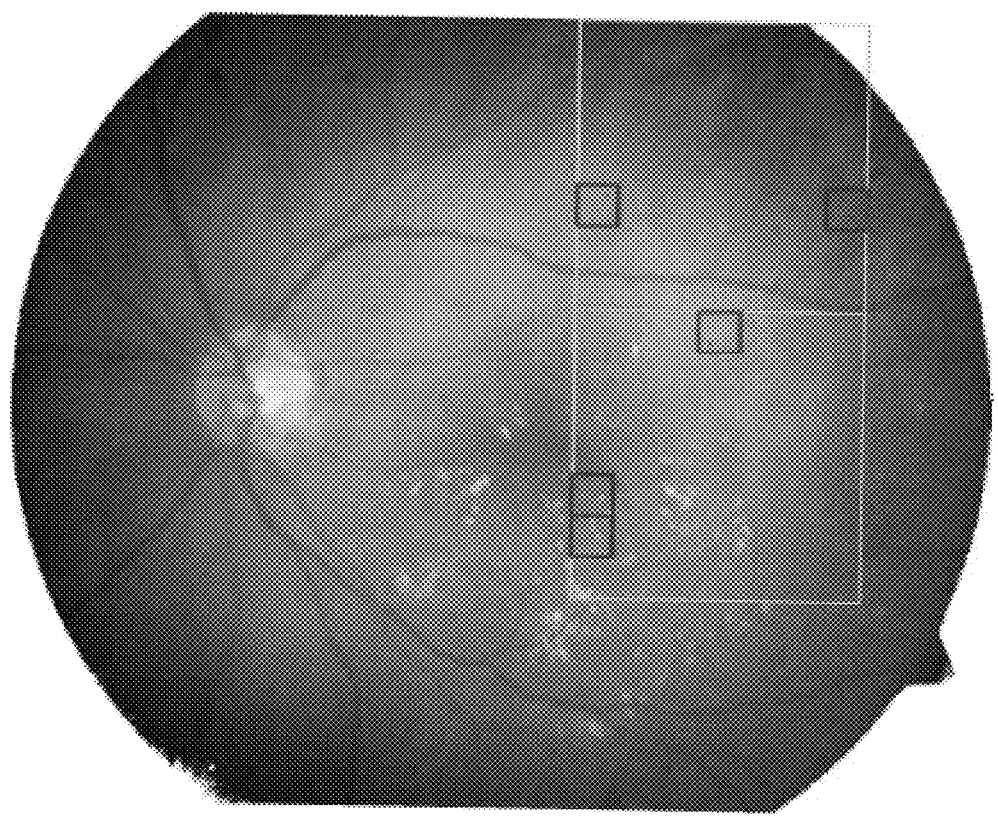
Figure 20C:
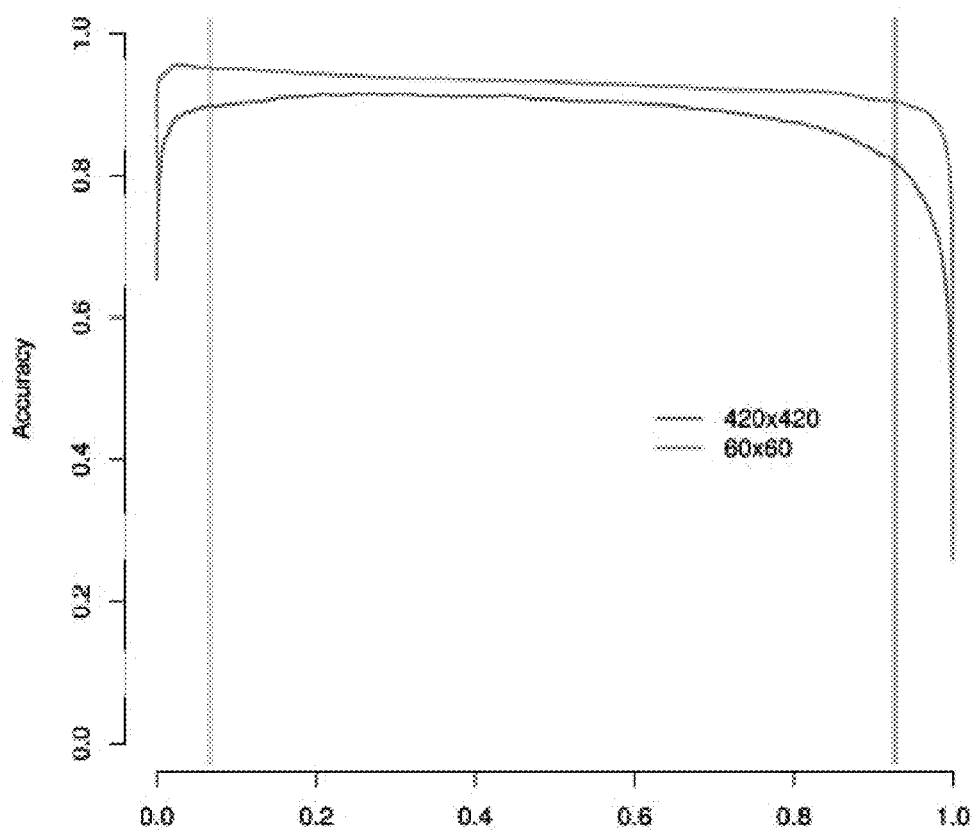

FIG. 19 is a graph illustrating a ROC analysis, with an area under the curve of 0.9828 and 0.9621 for the 60×60 and 420×420 datasets. FIG. 19 also displays a variation in the accuracy, by having different cut-off points. For the 60×60 set, an acceptable specificity may be reached with a cutoff at 0.9, without sacrificing the accuracy greatly. For the 420×420 dataset, the cutoff point may be set to be at 0.10 and achieved a high sensitivity without sacrificing the accuracy.

The images from the DiaRetDB1 may be sliced into sizes of 60×60 and 420×420. After getting the probabilities for each slice, the lesions found by the CNN may be visually evaluated and compared them to the ground truth lesions provided by the database. The results of the 20 pictures with 51 lesions are shown in Table 19, which states that model B of the CNN in 60×60 and 420×420 sets detects most of the lesions but there are still a number of false positives in the 60×60 set. If the 420×420 CNN model is running to detect the lesions first and the 60×60 model is running over those positives, the number of false positives decreases, holding the true positive cases.

TABLE 19

DiaRetDB1 testing.
51 lesions from dataset C

| | Cutoff | TP | FP | FN |
|---|---|---|---|---|
| 60 × 60 | 0.90 | 49 | 385 | 2 |
| 420 × 420 | 0.10 | 49 | 6 | 2 |
| First: 420 × 420 | 0.10 | 49 | 129 | 2 |
| Next: 60 × 60 | 0.90 | | | |

FIG. 20 illustrates an example of a final result according to embodiments of the disclosure. In FIG. 20, the yellow and red squares represent the predicted positive areas using two trained CNNs with sizes of 420×420 and 60×60, respectively. In addition, the vertical blue and green lines on the left graph represent the cut-off point of the probability value. As depicted in FIG. 20, keeping the fixed cut-off point for the 60×60 with a high probability and moving the cut-off point for the 420×420 from zero to higher values of probability reduce the number of false positives. Specifically, FIG. 20 illustrates results including: (a) predicted lesions 24, true lesions 6, and false positives 24; (b) predicted lesions 8, true lesions 6, and false positives 2; and (c) predicted lesions 5, true lesions 6, and false positives, 0.

Systems and methods are contemplated that include using a CNN model that increases the performance of the identification and classification of microaneurysms representing small local features. The method further combines the sequential use of a CNN with a high sensitivity followed by a CNN with a high specificity to detect microaneurysms with few false positives. The disclosed preprocessing technique may decrease the training time and improve the quality of the images for annotations. In addition, the new feedback methodology for training demonstrated that it had the ability to improve the accuracy.

What is claimed is:

1. A method comprising:
a) receiving an image comprising an object of interest;
b) generating an enhanced image by at least preprocessing the image to enhance at least a portion of the image comprising the object of interest;
c) determining, based on inputting the enhanced image into at least two neural networks, at least two classifications of the enhanced image, wherein the at least two neural networks comprise a first convolutional neural network (CNN) optimized for sensitivity by training the first CNN to achieve a sensitivity above a sensitivity threshold, and a second CNN optimized for specificity by training the second CNN to achieve a specificity above a specificity threshold;
d) determining, based on a combination of the at least two classifications, a characteristic of the object of interest;
e) outputting the characteristic of the object of interest;
f) determining, based on a feedback function and the steps a)-e), a loss function value; and
g) selectively iterating the steps a)-f) until the loss function value meets a threshold value condition.

2. The method of claim 1, wherein the characteristic comprises enhanced image size.

3. A system comprising:
a storage device configured to store a plurality of images;
a classification device configured to:
  a) receive, from the storage device, an image comprising an object of interest;
  b) generate an enhanced image by at least preprocessing the image to enhance at least a portion of the image comprising the object of interest;
  c) determine, based on inputting the enhanced image into at least two neural networks, one or more classifications of the enhanced image, wherein the at least two neural networks comprise a first convolutional neural network (CNN) optimized for sensitivity by training the first CNN to achieve a sensitivity above a sensitivity threshold, and a second CNN optimized for specificity by training the second CNN to achieve a specificity above a specificity threshold;
  d) determine, based a combination of the at least two classifications, a characteristic of the object of interest;
  e) output the characteristic of the object of interest,
  f) determine, based on a feedback function and the steps a)-e), a loss function value; and
  g) selectively iterate the steps a)-f) until the loss function value meets a threshold value condition.

4. A non-transitory computer-readable medium comprising
  a) computer-executable instructions that when executed by a processor perform the method comprising:
  b) receiving an image comprising an object of interest;
  c) generating an enhanced image by at least preprocessing the image to enhance at least a portion of the image comprising the object of interest;
  d) determining, based on a first convolution neural network (CNN), a first classification of the enhanced image, wherein the first CNN is optimized for sensitivity by training the first CNN to achieve a sensitivity above a sensitivity threshold;
  e) determining, based on a second CNN, a second classification of the enhanced image, wherein the second CNN is optimized for specificity by training the second CNN to achieve a specificity above a specificity threshold;
  f) determining, based on a combination of the first classification and the second classification, a characteristic of the object of interest;
outputting the characteristic of the object of interest;
  g) receiving feedback in response to providing the characteristic of the object of interest;
  h) determining, based on at least the feedback, a loss function value;
  i) modifying, based on at least the feedback, at least one of the first classification and the second classification; and
  j) iterating, using the modified at least one of the first classification and the second classification, steps d)-i) until the loss function value meets a threshold condition.

5. The method of claim 1, wherein preprocessing the image to enhance at least a feature of the image comprises:
  selecting coordinates of the object of interest corresponding to an approximate center of a second characteristic of the object of interest; and
  centering the image according to the selected coordinates; and
  cropping the image.

6. The method of claim 1, wherein preprocessing the image to enhance at least a feature of the image comprises one or more of:
  a transformation of the lightness of at least a feature of the image;
  a transformation of the color of at least a feature of the image;
  a transformation of the lightness and the color of at least a feature of the image; or
  a reduction of the color variance of at least a feature of the image.

7. The method of claim 1, wherein the feature to be enhanced is indicative of a microaneurysm.

8. The method of claim 1, wherein the feature to be enhanced is indicative of a blood vessel, a hemorrhage, or the normal background of the image.

* * * * *